(12) United States Patent  (10) Patent No.: US 9,411,146 B2
Iwai  (45) Date of Patent: Aug. 9, 2016

(54) OBSERVATION DEVICE

(71) Applicant: HAMAMATSU PHOTONICS K.K., Hamamatsu-shi, Shizuoka (JP)

(72) Inventor: Hidenao Iwai, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 281 days.

(21) Appl. No.: 14/355,593

(22) PCT Filed: Nov. 1, 2012

(86) PCT No.: PCT/JP2012/078362
§ 371 (c)(1),
(2) Date: May 1, 2014

(87) PCT Pub. No.: WO2013/065796
PCT Pub. Date: May 10, 2013

(65) Prior Publication Data
US 2014/0340503 A1  Nov. 20, 2014

(30) Foreign Application Priority Data
Nov. 2, 2011  (JP) .................................. 2011-241590

(51) Int. Cl.
*G02B 21/08* (2006.01)
*G02B 21/36* (2006.01)
(Continued)

(52) U.S. Cl.
CPC .......... *G02B 21/365* (2013.01); *G01B 9/02002* (2013.01); *G01B 9/02043* (2013.01); *G01B 9/02045* (2013.01); *G01B 11/00* (2013.01); *G02B 21/08* (2013.01); *G02B 21/361* (2013.01)

(58) Field of Classification Search
CPC .................................................. G02B 21/365

USPC ............................................................ 348/79
See application file for complete search history.

(56) References Cited

U.S. PATENT DOCUMENTS 5,305,084 A * 4/1994 Doi ........................... G01P 3/36
348/646
2008/0309946 A1* 12/2008 Chou ................. G01B 9/02002
356/487

(Continued)

FOREIGN PATENT DOCUMENTS

JP      H05-60511 A     3/1993
JP      2010-540973 A   12/2010
WO      WO-2011/136382 A1   11/2011

OTHER PUBLICATIONS

English-language translation of International Preliminary Report on Patentability (IPRP) dated May 15, 2014 that issued in WO Patent Application No. PCT/JP2012/078362.

(Continued)

*Primary Examiner* — Christopher S Kelley
*Assistant Examiner* — Asmamaw G Tarko
(74) *Attorney, Agent, or Firm* — Drinker Biddle & Reath LLP

(57)  ABSTRACT

An observation device is provided with a light source section, a detection section and an arithmetic operation section. The light source section emits light to a moving object from multiple directions. a detection section is disposed on a predetermined plane such that scattered light having an identical scattering angle enters at an identical position, outputs data temporally changing at a frequency corresponding to an amount of Doppler shift of light that reaches at each position on the predetermined plane. An arithmetic operation section performs a one-dimensional Fourier transform with respect to time variables, for data having a position in the first direction on the predetermined plane, a position in the second direction on the predetermined plane, and a time as variables, and extracts data having an identical incident angle relative to the object from the Fourier-transformed data, on the basis of Doppler Effect.

17 Claims, 21 Drawing Sheets

(51) Int. Cl.
*G01B 11/00* (2006.01)
*G01B 9/02* (2006.01)

(56) References Cited

U.S. PATENT DOCUMENTS

| | | | | |
|---|---|---|---|---|
| 2009/0093980 A1* | 4/2009 | Kemp | ................. | A61B 5/0066 |
| | | | | 702/77 |
| 2013/0063729 A1* | 3/2013 | Iwai | ...................... | G01N 21/41 |
| | | | | 356/486 |
| 2013/0094027 A1* | 4/2013 | Iwai | ...................... | G01N 21/41 |
| | | | | 356/450 |

OTHER PUBLICATIONS

Wonshik Choi et al., "Tomographic phase microscopy," Nature Methods vol. 4, No. 9, Aug. 12, 2007, pp. 717-719.

Takahiro Ikeda, "Hilbert phase microscopy for investigating fast dynamics in transparent systems," Optics Letters, vol. 30, No. 10, 2005, pp. 1165-1167.

Niyom Lue et al., "Synthetic aperture tomographic phase microscopy for 3D imaging of live cells in translational motion," Optics Express, vol. 16, No. 20, 2008, pp. 16240-16246.

* cited by examiner

OBSERVATION DEVICE

TECHNICAL FIELD

The present invention relates to a device for observing an image of an object.

BACKGROUND ART

Use of a phase shift method described in non-patent literature 1 or 2 has been known as a technology of observing an image of an object to obtain a three-dimensional image of the object. In an observation device according to the phase shift method, light with a wavelength of which is emitted from a light source divided in two light components, one of which permeates the object and becomes object light and the other one of which becomes reference light, so as to take a two-dimensional image made by an interference between the object light and the reference light. An optical path length of the reference light is eccentric by $\lambda/4$ so that four two-dimensional images are taken, a specified arithmetic is performed for the four two-dimensional images so as to obtain two-dimensional complex amplitude, and then a three-dimensional amplitude image and a three-dimensional phase image of the object are obtained from a plurality of complex amplitude images to be obtained from each direction of light incident to the object.

Further, a Hilbert transform method described in a non-patent literature 3 has been known as a technology of obtaining a complex amplitude image from one captured image.

CITATION LIST

Non-Patent Literature
[Non-Patent Literature 1] Wonshik Choi, "Tomographic phase microscopy," Nature Methods—4, 717-719 (2007).
[Non-Patent Literature 2] Niyom Lue, "Synthetic aperture tomographic phase microscopy for 3D imaging of live cells in translational motion," OPTICS EXPRESS, 16, 16240, (2008)
[Non-Patent Literature 3] Takahiro Ikeda, "Hilbert phase microscopy for investigating fast dynamics in transparent systems," OPTICS LETTERS, 30, (2005)

SUMMARY OF INVENTION

Technical Problem

In the observation device using the phase shift method described in the non-patent literature 1 or 2, it is required that the object is in a stationary state while four two-dimensional images are obtained. In order to obtain an image of a moving object, it is required to obtain the four two-dimensional images by using an optical detector having a high frame rate and capable of taking image at a high speed during a term in which the object is regarded as being in the stationary state. However, the optical detector capable of taking the image at a high speed is expensive, or has a small number of pixels and low spatial resolution. Further, since an exposure time is at most within a period in which the object is regarded as being stationary, in view of an aspect of SN, image quality is decreased and sensitivity is low. When the Hilbert transform described in the non-patent literature 3 is used, further, the spatial resolution is deteriorated by about $\frac{1}{4}$, so that the image quality is decreased.

The present invention has been made to solve the above-mentioned problems in the prior art, and an aspect of the present invention is to provide an observation device capable of obtaining an image of a moving object even though an optical detector of which a reading speed per pixel is low is used.

Solution to Problem

In accordance with an aspect of the present invention, an observation device is provided. The observation device includes: a light source section for emitting light to a moving object from multiple directions; a detection section for being disposed on a predetermined plane such that scattered light having an identical scattering angle from among scattered light generated by the object upon irradiation with the light by the light source enters at an identical position, and when a direction perpendicular to a moving direction of the object is defined as a first direction and a direction parallel with the moving direction of the object is defined as a second direction, outputting data temporally changing at a frequency corresponding to an amount of Doppler shift of light that reaches at each position on the predetermined plane, for each position in the first direction and the second direction, at each times; an arithmetic operation section for performing a one-dimensional Fourier transform with respect to time variables, for data having a position in the first direction on the predetermined plane, a position in the second direction on the predetermined plane, and a time as variables, and extracting data having an identical incident angle relative to the object from the Fourier-transformed data, on the basis of Doppler Effect; and an optical system for receiving a light emitted from the light source and splitting the received light in front of the object in two light components so as to yield first light and second light, modulating the first light or the second light with a modulator, and then causing a heterodyne interference between the first light and the second light on the predetermined plane.

In the observation device of the present invention, the light is emitted by the light source section to the moving object from multiple directions, and the moving object emits scattered light. The scattered light is subjected to an amount of Doppler shift according to the scattering direction. Among the scattered lights passing through a predetermined optical system, the scattered light with an identical scattering angle is received at an identical position of the detection section. The detection section outputs data temporally changing at a frequency corresponding to an amount of Doppler shift of light that reached at each position on a predetermined plane, for each position in the first direction and the second direction, at each times. A one-dimensional Fourier transform with respect to time is performed, for data having a position in first-direction on the predetermined plane, a position in the second-direction on the predetermined plane, and a time as variables by the arithmetic operation section, and extracts data having an identical incident angle relative to the object from the Fourier transformed data, on the basis of the Doppler effect. According to this configuration, since it is possible to extract data with the same incident angle for the object by using the Doppler Effect, it is unnecessary to photograph an image of the object at plural times within a period when the object is regarded as being stationary. Accordingly, it is possible to obtain the image of the moving object even though the optical detector of which the reading speed per pixel is low is used.

Further, the arithmetic operation section may extract data of a plane surface satisfying following Equation (1) from the Fourier transformed data,

[Equation (1)]

$$\omega - \Omega = \alpha y + \beta \sin \theta_0 \qquad (1)$$

in which ω is a time frequency of the Fourier transformed data, Ω is a modulation frequency, y is a position in the second direction of the detection section, θ$_0$ is an incident angle, and α and β are constant. In this case, by Equation (1) the data having the identical angle for the object can be extracted from the one dimensional Fourier transformed data on the time variable, based on the Doppler Effect. In the Equation (1), the objet moves at a velocity V so as to cause the Doppler Effect, and it is expressed that a certain relation is present between the time frequency ω and the position y, based on the Doppler Effect.

The observation device further includes a condensing lens interposed between the object and the detection section, and the arithmetic operation section may extract data of the surface satisfying following Equation (2) from the Fourier transformed data,

[Equation (2)]

$$\omega - \Omega = \frac{2\pi V}{\lambda}\left[\sin\left(\tan^{-1}\left(\frac{y}{f_Y}\right)\right) - \sin\theta_0\right] \quad (2)$$

in which ω is a time frequency of the Fourier transformed data, Ω is a modulation frequency of the modulator, V is a moving velocity of the object, λ is a wavelength of the light emitted by the light source section, y is a position in the second direction of the detection section, $f_Y$ is a focal distance in the second direction of the condensing lens, and θ$_0$ is the incident angle.

In this case, by Equation (2) the data having the identical angle for the object can be accurately extracted from the one dimensional Fourier transformed data on the time variable, based on the Doppler Effect.

Further, the observation device further includes a condensing lens interposed between the object and the detection section, and the light receiving surface of the detection section is disposed on a surface in which a Fresnel diffraction image of the object is formed in the first direction and a Fraunhofer diffraction image of the object is formed in the second direction by the condensing lens. The arithmetic operation section may include a first Fourier transform section for performing the one dimensional Fourier transform with respect to a time variable, a second Fourier transform section for performing a one dimensional Fourier transform with respect to the first direction, a diagonal cut section for extracting data having an identical incident angle for the object based on the Doppler Effect, and a secondary phase division section for dividing a secondary phase which is a value determined by a position at which the detection section is disposed. In this case, an incident angel dependence complex amplitude image can be appropriately obtained.

The observation device further includes a condensing lens interposed between the object and the detection section, and the light receiving surface of the detection section is disposed on a surface in which a Fraunhofer diffraction image of the object is formed in the first direction and a Fraunhofer diffraction image of the object is formed in the second direction by the condensing lens. The arithmetic operation section may include a first Fourier transform section for performing the one dimensional Fourier transform with respect to a time variable, and a diagonal cut section for extracting data having an identical incident angle for the object based on the Doppler Effect. In this case, an incident angel dependence complex amplitude image can be appropriately obtained.

The observation device further includes a condensing lens interposed between the object and the detection section, and the light receiving surface of the detection section is disposed on a surface in which an image of the object is formed in the first direction and a Fraunhofer diffraction image of the object is formed in the second direction by the condensing lens. The arithmetic operation section may include a first Fourier transform section for performing a one dimensional Fourier transform with respect to a time variable, a second Fourier transform section for performing a one dimensional Fourier transform with respect to the first direction, and a diagonal cut section for extracting data having an identical incident angle for the object based on the Doppler Effect. In this case, an incident angel dependence complex amplitude image can be appropriately obtained.

The observation device further includes a condensing lens interposed between the object and the detection section, in which the condensing lens is a fθ lens and the arithmetic operation section may extract data of the surface satisfying following Equation (3) from the Fourier transformed data,

[Equation (3)]

$$\omega - \Omega = \frac{2\pi V_Y}{\lambda}\left[\sin\left(\frac{y}{f_Y}\right) - \sin\theta_0\right] \quad (3)$$

in which ω is a time frequency of the Fourier transformed data, Ω is a modulation frequency of the modulator, $V_Y$ is a moving velocity of the object the a second direction, λ is a wavelength of the light emitted by the light source section, y is a position in the second direction of the detection section, $f_Y$ is a focal distance of the second direction of the condensing lens, and θ$_0$ is an incident angle.

In this case, by Equation (3) the data having an identical angle for the object can be accurately extracted from the one dimensional Fourier transformed data with respect to a time variable, based on the Doppler Effect.

The observation device further includes an illumination lens which receives the light emitted from the light source section and then emits the light diverged or converged in the second direction, the illumination lens being disposed between the light source section and the object. In this case, the light can be emitted to the object from multiple directions.

The observation device further includes a velocity detection section for detecting the moving velocity of the object, in which the arithmetic operation section may perform a correction in a velocity change of the object while performing the one dimensional Fourier transform with respect to a time variable based on the velocity of the object detected by the velocity detection section.

Further, an emission of the light to the object may be performed by an optical arrangement of a transmitted illumination, or an emission of the light to the object may be performed by an optical arrangement of a reflection illumination.

Further, the light source section may be a light source for generating light of a single longitudinal mode, or for generating broadband light. Further, the light source section may be a mode-locked laser.

Advantageous Effects of Invention

According to the present invention, it is possible to obtain the image of the object even though the optical detector of which the reading speed per pixel is low is used.

BRIEF DESCRIPTION OF DRAWINGS

FIG. 13 is a view schematically illustrating a frequency dependence complex amplitude image a;

DESCRIPTION OF EMBODIMENTS

Figure 1:
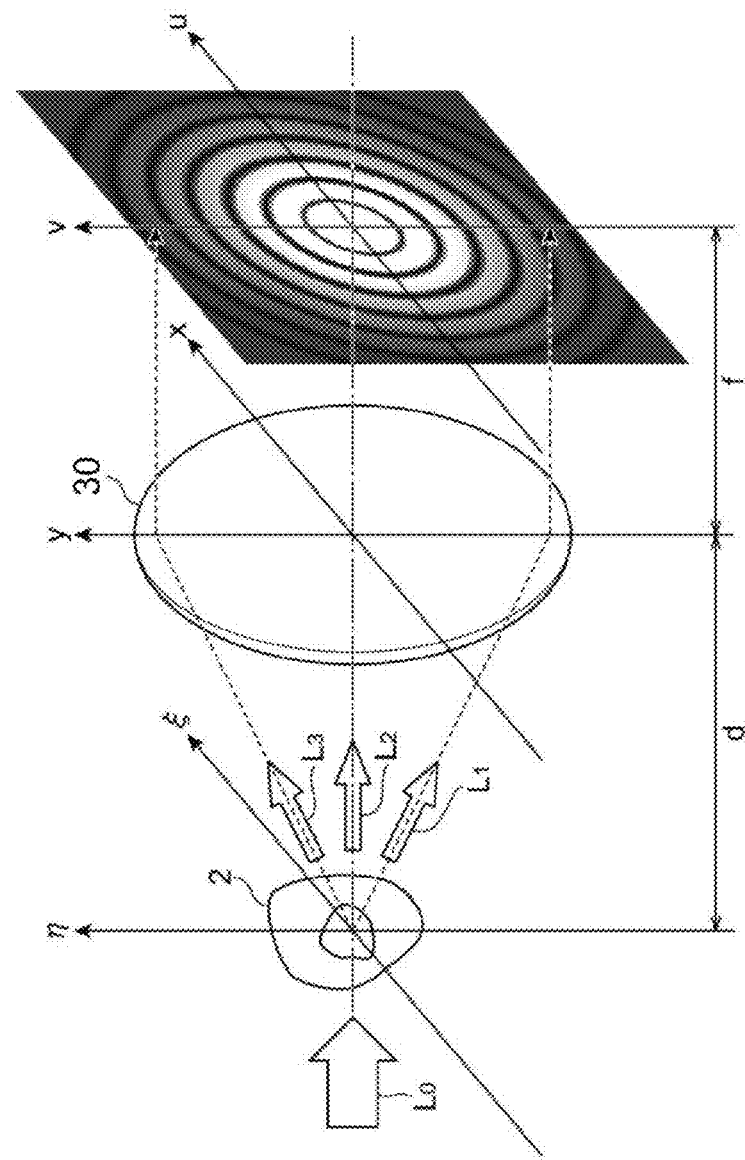
FIG. 1 is a view illustrating a principle of acquiring an image of an object by means of an observation device in accordance with an embodiment.

Hereinafter, an embodiment of the present invention will be described in detail with reference to the accompanying drawings. Identical reference numerals denote the same or similar structural elements in the description of the drawings, and a duplicated description will be omitted.

An observation device in the present embodiment acquires an image of an object by using a Doppler shift effect induced when light is emitted to a moving object, and particularly by using a certain relation between an incident direction of light incident to the object and an amount of Doppler shift. Firstly, a principle of acquiring the image of the object by means of the observation device of the present embodiment will be described with reference to FIG. 1.

FIG. 1 is a view illustrating a principle of acquiring the image of the object by means of the observation device according to the present embodiment. In FIG. 1, ξ-η coordinate system, x-y coordinate system, and u-v coordinate system are shown. All of ξ axis, a η axis, an x axis, a y axis, an u axis and a v axis are perpendicular to an optical axis of a condensing lens 30. The ξ axis and the x axis are parallel with each other. The η axis and the y axis are parallel with each other. An object 2 to be observed is present on a ξ-η plane surface. The condensing lens 30 is present on an x-y plane surface. Further, a back focal plane of the condensing lens 30 is identical to a u-v plane surface. A distance between the ξ-η plane surface and the x-y plane surface is d. The distance between the x-y plane surface and the u-v plane surface is identical to a focal distance f of the condensing lens 30. In this specification, the ξ axial direction, the x axial direction, the X axial direction and a first direction are parallel with one another, and the η axial direction, the y axial direction, the Y axial direction and a second direction are parallel with one another.

The object 2 moves in a -η direction on the ξ-η plane surface, and light $L_0$ with different incidence angles is emitted to the object 2. Scattered lights $L_1$, $L_2$ and $L_3$ generated by emitting the light $L_0$ to the object 2 propagate in multiple directions, and are subjected to a Doppler shift by the movement of the object 2. The scattered light $L_1$ with a vector component of a scattering direction identical to a movement direction of the object 2 has an increasing optical frequency. The scattered light $L_2$ having no vector component of the scattering direction identical to the movement direction of the object 2 has an unchanged optical frequency. The scattered light $L_3$ with a vector component of a scattering direction opposite to a movement direction of the object 2 has a decreasing optical frequency. These scattered lights $L_1$, $L_2$ and $L_3$ arrive at the u-v plane surface through the condensing lens 30.

Figure 2:
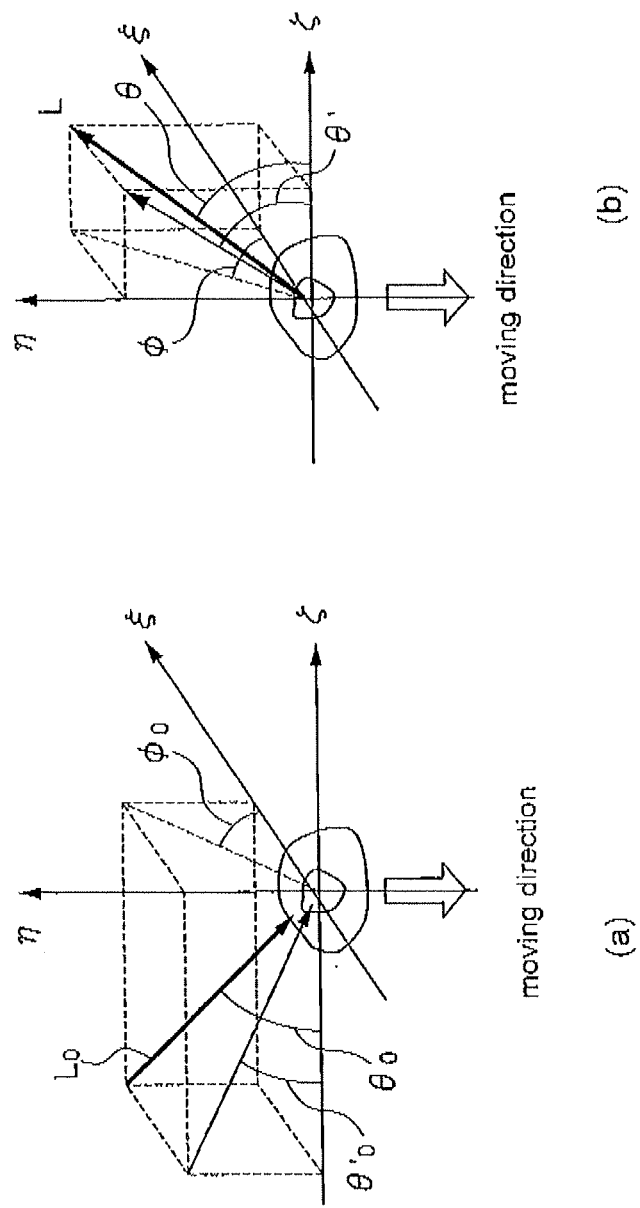
FIG. 2(a) is a view illustrating an incident angle of incident light $L_0$.
FIG. 2(b) is a view illustrating a scattering angle θ of scattered light generated by an object 2.

FIG. 2(a) is a view illustrating an incident angle of the incident light $L_0$, and FIG. 2(b) is a view illustrating a scattering angle of the scattered light L by means of the object 2. As shown in FIG. 2(a), in order to express the incident angle of the incident light $L_0$, two parameters of an elevation angle $θ_0$ and an azimuthal angle $φ_0$ need to be described. A point light source imaginarily disposed in the object 2 is an origin of the ξ-η-ζ coordinate system. With respect to the origin, an angle between a vector of an incident direction of the incident light $L_0$ and the ζ axis is referred to as the elevation angle $θ_0$, and an angle between a projection vector of the vector of the incident direction to the ξ η plane and the ξ axis is referred to as the azimuthal angle $θ_0$ Further, an angle between the projection vector of the incident light $L_0$ to the η-ζ plane and the ζ axis is defined as $θ_0'$. Similarly, as shown in FIG. 2(b), an angle between a direction vector of the scattered light L from the point light source and the ζ axis is defined as an elevation angle θ, and an angle between a projection vector of the scattered directional vector to a ξ-η plane surface and the ξ axis is defined as an azimuthal angle φ. Further, an angle between a projection vector of the scattered light L to the η-ζ plane and the ζ axis is defined as θ'.

Figure 3:
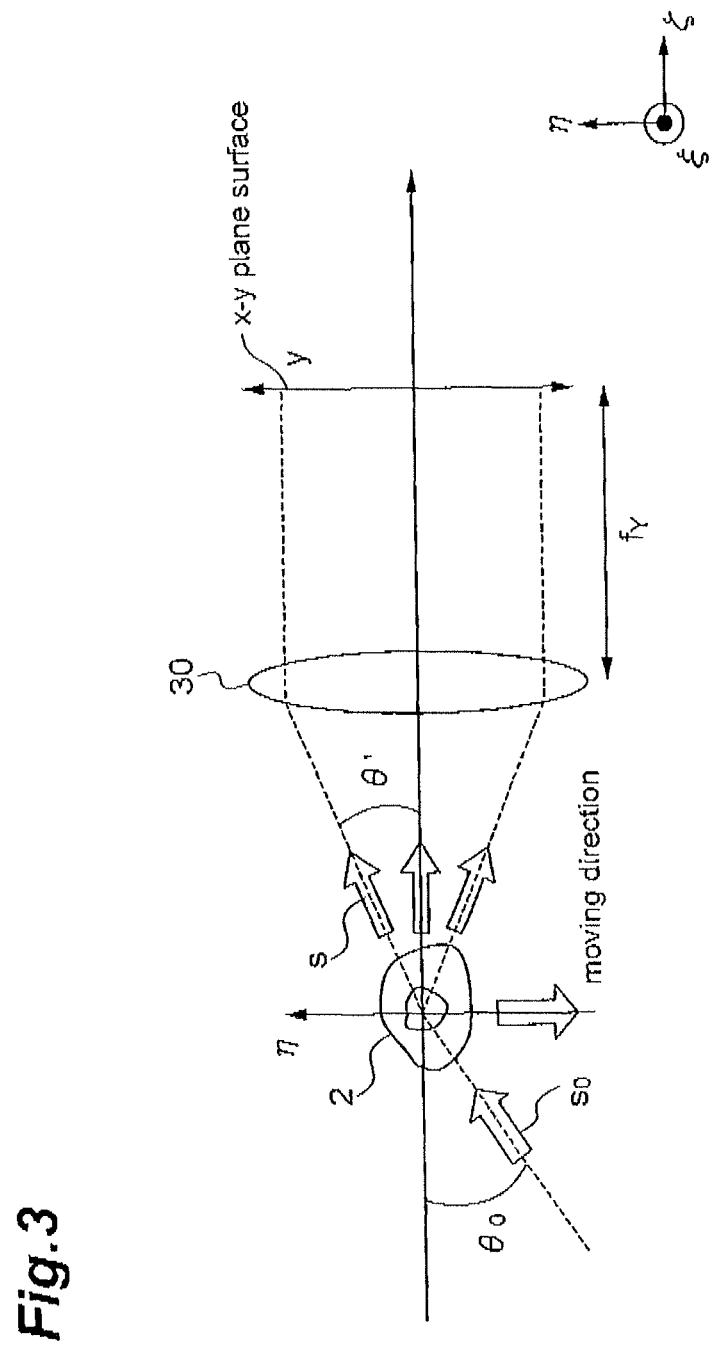
FIG. 3 is a view illustrating the incident light $L_0$ scattered by the object 2 which is viewed from a direction of ξ axis.

FIG. 3 is a view illustrating an appearance of the incident light $L_0$ scattered by the object 2 which is viewed from a direction of a ξ axis. In FIG. 3, a unit incident vector of the incident light $L_0$ is defined as $s_0$, and a unit scattering vector of the scattered light L is expressed by s.

When light with a frequency of $\omega_0$ is emitted to the object 2 moving at a velocity vector V, the frequency of scattering waves generated in the object 2 is changed by a Doppler shift frequency $\omega_d$ which is expressed by Equation (4) due to a Doppler effect. In Equation (4), a unit incident vector of the incident light for the object 2 is defined as $s_0$, and a unit scattering vector indicating a scattering direction of the scattered wave generated in the object 2 is defined as s. In Equation (4), λ is a wavelength of light. Equation (4) indicates that an amount of the Doppler shift $\omega_d$ is proportional to a scalar product of $(s-s_0)$ and a velocity vector V of a moving object. In Equation (4), a frequency transition by an inner product term $(\omega_{d1}=-(2\pi/\lambda)s_0\cdot V)$ of a unit incident vector $s_0$ and a velocity vector V is called a first Doppler Effect. Further, a frequency transition by an inner product term $(\omega_{d2}=(2\pi/\lambda)s\cdot V)$ of a unit scattered vector s and a velocity vector V is called a second Doppler Effect. In this case, an optical frequency of the scattered light caused by the object 2 is affected by an incident vector component and a scattering directional vector component as follows. That is, the incident light with the incident vector component in a direction identical to a moving direction of the object 2 has a low optical frequency of the scattered light generated in the object 2 by the first Doppler Effect. The incident light with the incident vector component in a direction opposite to the moving direction of the object 2 has a high optical frequency of the scattered light generated in the object 2 by the first Doppler Effect. The incident light without the incident vector component in a direction parallel with the moving direction of the object 2 is not affected by the first Doppler Effect and has an unchanged optical frequency of the scattered light generated in the object 2. The scattered light with the vector component in a scattering direction identical to the moving direction of the object 2 has a high optical frequency due to the second Doppler Effect. The scattered light with the vector component in a scattering direction opposite to the moving direction of the object 2 has a low optical frequency due to the second Doppler Effect. The scattered light with the scattered vector component in a direction parallel without the moving direction of the object 2 is not affected by the second Doppler Effect and has an unchanged optical frequency of the scattered light generated in the object 2.

[Equation (4)]

$$\omega_d = \frac{2\pi}{\lambda}(s - s_0) \cdot V \quad (4)$$

In Equation (4), if the velocity V and the unit scattering vector s are constant, it will be known that the Doppler shift frequency $\omega_d$ of a diffraction wave observed at a certain position corresponds to the unit incident vector $s_0$ one to one. As described above, the complex amplitude image of waves of the Doppler shift frequency $\omega_d$ depends on the incident angle $\theta_0$ of incident waves.

It is known that a three dimensional amplitude image and a three dimensional phase image may be obtained from the complex amplitude image, in which the incident angle $\theta_0$ is used as a variable (hereinafter, referred to as an incident angle dependence complex amplitude image), by using an X ray CT algorithm or a diffractive tomography algorithm. Therefore, if the incident angle dependence complex amplitude image may be obtained, the three dimensional amplitude image and the three dimensional phase image can be obtained. Hereinafter, a comparison of a sequence of acquiring the incident angle dependence complex amplitude image in the observation device according to the embodiment of the present invention with a sequence of acquiring an incident angle dependence complex amplitude image by a phase shift method will be described in order to help in understanding the present invention.

Figure 4:
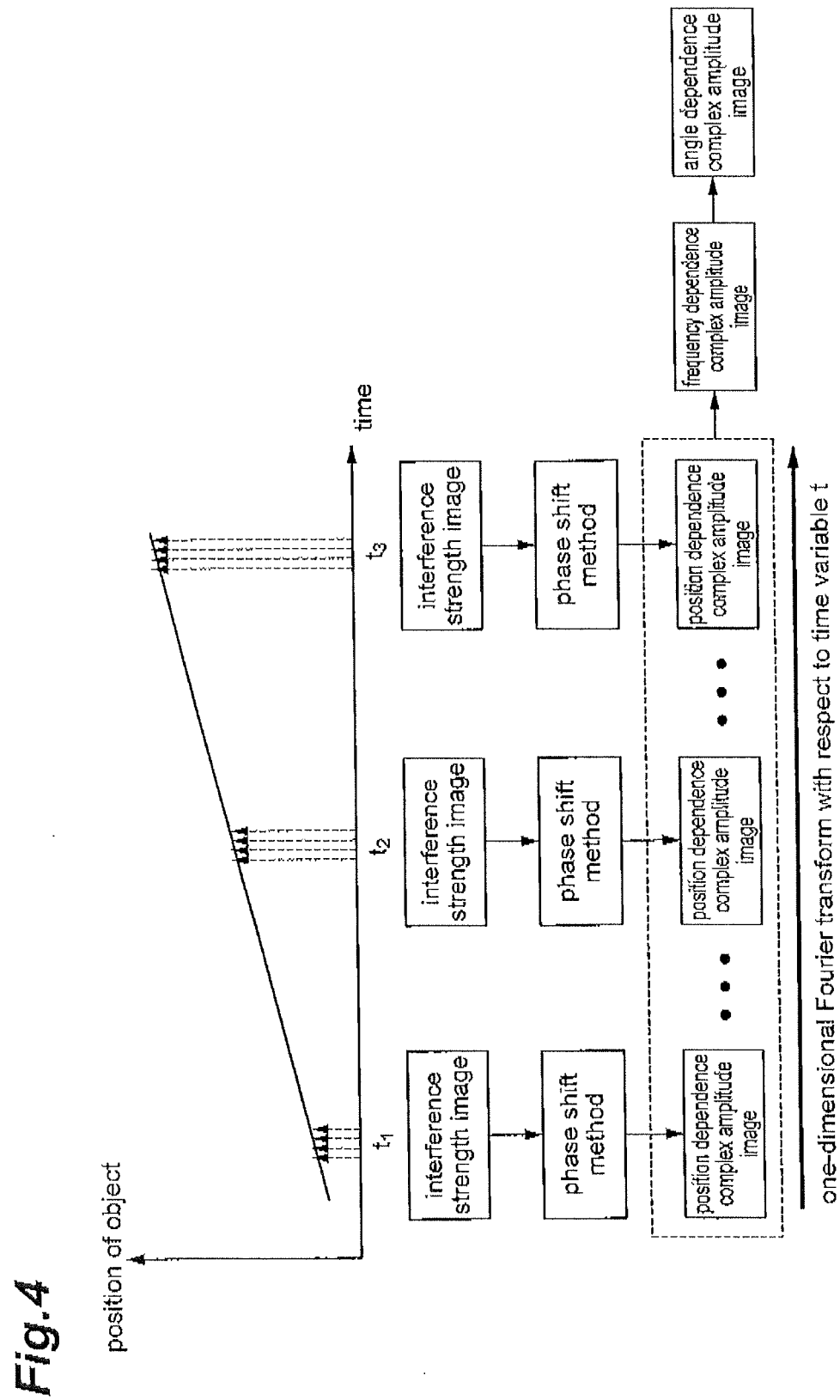
FIG. 4 is a view illustrating a sequence of acquiring an incident angle dependence complex amplitude image by means of a phase shift method according to the conventional art.

FIG. 4 is a view illustrating a sequence of acquiring the incident angle dependence complex amplitude image according to the conventional phase shift method. In FIG. 4, a longitudinal axis of a graph indicates a position of the object, and a cross axis of the graph denotes a time. An arrow mark shown at an upper portion of FIG. 4 indicates an imaging timing. It is regarded that the object moves at a constant velocity in a specific direction. In the phase shift method, for the object moving at a time $t_1$, an image of the object is imaged by plural pieces within a time when it is regarded that the object does not move, and interference strength images of the plural pieces of the images are acquired. In the phase shift method, at this time, the complex amplitude image in which the position of the object is used as a variable (hereinafter, referred to as a position dependence complex amplitude image) is acquired by making the interference strength image interfere with the reference light in which an optical length is changed by λ/4. Since the object moves at the constant velocity, meanwhile, the position dependence complex amplitude image may be a complex amplitude image in which a time is used as a variable. Such a position dependence complex amplitude image is acquired at a desired time interval by plural pieces (see $t_1$, $t_2$ and $t_3$ of FIG. 4). In a synthetic aperture tomography, a complex amplitude image in which a frequency is used as a variable (hereinafter, referred to as a frequency dependence complex amplitude image) is acquired by performing a one dimensional Fourier transform with respect to a time variable t to the position dependence complex amplitude image obtained at each time. Then, the incident angle dependence complex amplitude image is acquired by using the relation between the frequency m and the incident angle $\theta_0$.

In the phase shift method, as described above, for the moving object, it is necessary that the object is imaged by plural pieces within a time when it is regarded that the object does not move, so as to acquire A plurality of the interference strength images. If the object such as a cell and the like is made to flow in a flow cytometer, the cell moves at several meters/second. If laser light with a wavelength of 633 nm is emitted to a cell which has a diameter of 10 μm and moves at 1 m/second and the cell is photographed by using an objective lens with NA=0.45 (twenty-times magnification), a diffraction limit of the objective lens is estimated to be about 0.9 μm. For this reason, it is necessary to restrain a blur caused by the movement of the object up to 0.9 μm. Accordingly, if only strength image of the object is acquired, a photographing of the object must be completed within 0.9 μm/1 m/s=0.9 μs. If one piece of the complex amplitude image is acquired from four pieces of interference images, on the other hand, it is necessary to restrain a phase precision of the complex amplitude image up to 1/100. Therefore, a time interval of the four continuous pieces of the interference images is estimated from 0.633 μm/1 m/s/0.45/100 to 10-8 seconds. For this reason, in the phase shift method, under this condition, it is necessary to acquire the interference strength image by using a two-dimensional optical detector with a frame rate of about 100 MHz. However, it is difficult to obtain the two-dimensional optical detector with a super high-speed and pixels.

Figure 5:
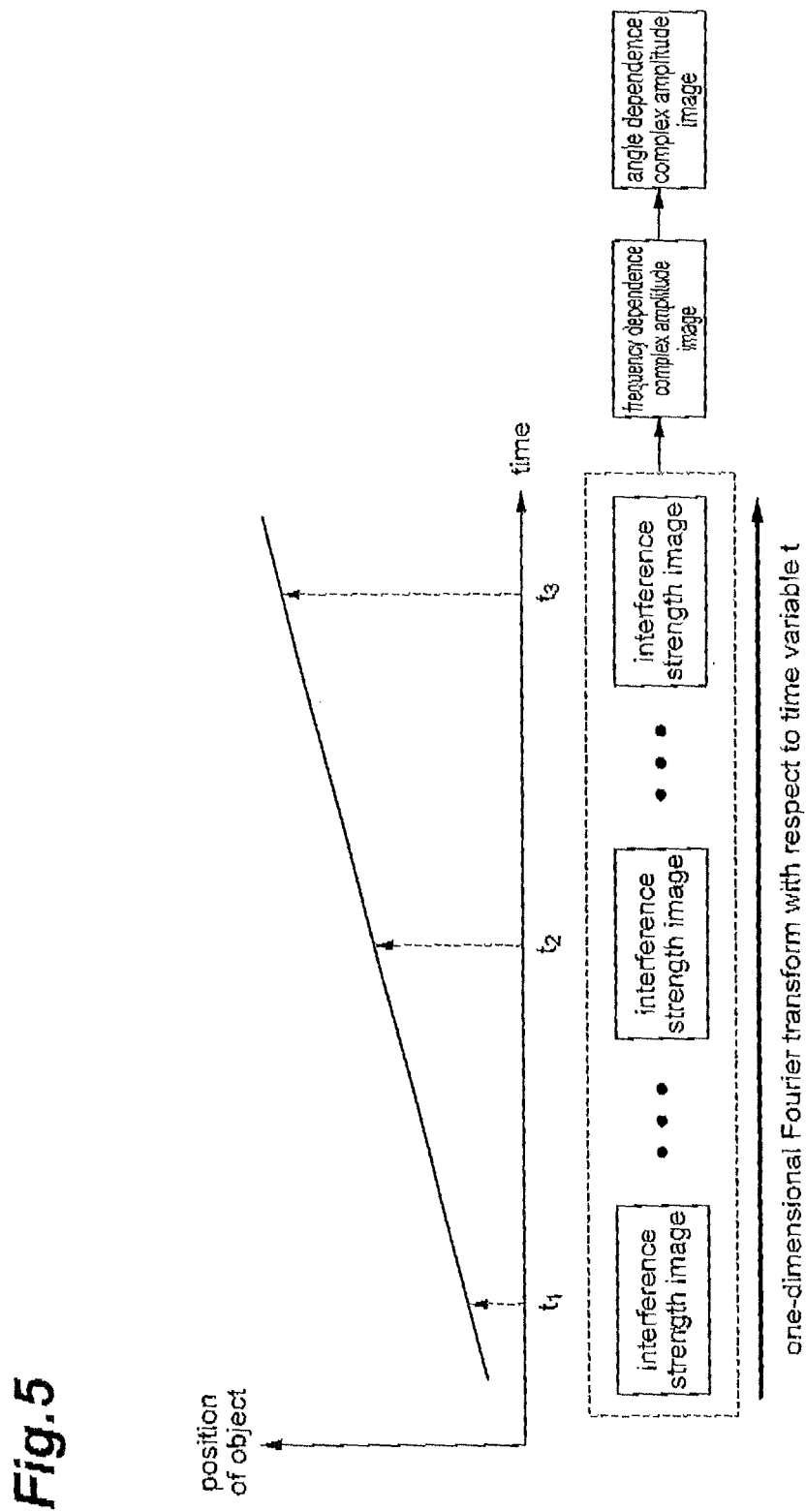
FIG. 5 is a view illustrating a sequence of acquiring an incident angle dependence complex amplitude image in the observation device 1 according to a first embodiment.

With respect to this, FIG. 5 is a view illustrating a sequence of acquiring the incident angle dependence complex amplitude image in the observation device according to the embodiment of the present invention. Similarly to FIG. 4, in FIG. 5, a longitudinal axis of a graph indicates a position of the object, and a cross axis of the graph denotes a time. An arrow mark shown at an upper portion of FIG. 5 indicates an imaging timing. It is regarded that the object moves at a constant velocity in a desired direction. In the observation device according to the present embodiment, for the object moving at a time $t_1$, an image of the object is taken by one piece within a time when it is regarded that the object does not move, and one interference strength image is acquired. This interference strength image is acquired at a desired time interval by plural times (see $t_1$, $t_2$ and $t_3$ of FIG. 5). Then, the frequency dependence complex amplitude image is acquired by performing the one dimensional Fourier transform with respect to a time variable t to the interference strength image obtained at each time, without performing an operation of calculating the position dependence complex amplitude image from the position dependence interference strength image. In turn, the incident angle dependence complex amplitude image is obtained from the frequency dependence complex amplitude image by using a certain relation between the Doppler shift frequency w and the incident angle $\theta_0$. As described above, in the observation device according to the present embodiment, since the object is photographed by one piece within a time when it is regarded that the object does not move, the incident angle dependence complex amplitude image with a high precision can be obtained although the two dimensional optical detector with a high frame rate is not used. Hereinafter, the configuration of the observation device according to the present invention will be described.

First Embodiment

First Placement Example

Figure 6:
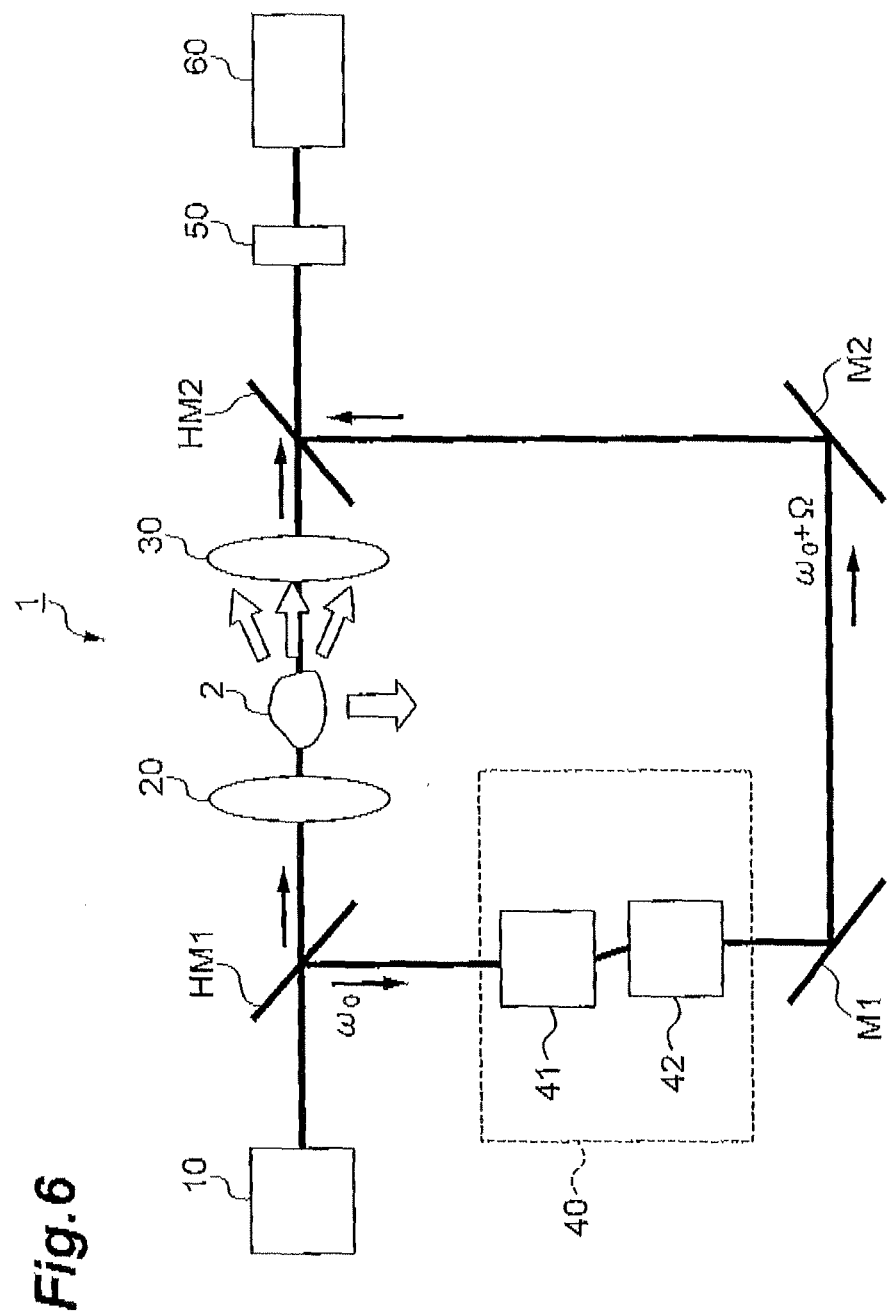
FIG. 6 is a view illustrating a configuration of the observation device 1 according to the first embodiment.

An observation device 1 according to the present embodiment acquires an incident angle dependence complex amplitude image of an object 2 based on the principle described above. FIG. 6 is a view illustrating a configuration of the observation device 1 according to the first embodiment. As shown in FIG. 6, the observation device 1 of the present embodiment includes a light source section 10, an illumination lens 20, a beam splitter HM1, a condensing lens 30, a beam splitter HM2, a modulation section 40, a mirror M1, a mirror M2, a detection section 50 and a arithmetic operation section 60.

The light source section 10 emits light through the illumination lens 20 to the moving object in multiple directions so that a Doppler effect is induced in the light. The light source section 10 is, for example a HeNe laser light source, and outputs light (optical frequency $\omega_0$), which is emitted to an object 2, as parallel light. The beam splitter HM1 inputs the light output from the light source section 10 in front of the object 2, splits the light into two light components, i.e., first light and second light, outputs the first light to the illumination lens 20, and outputs the second light to the modulation section 40.

Figure 7:
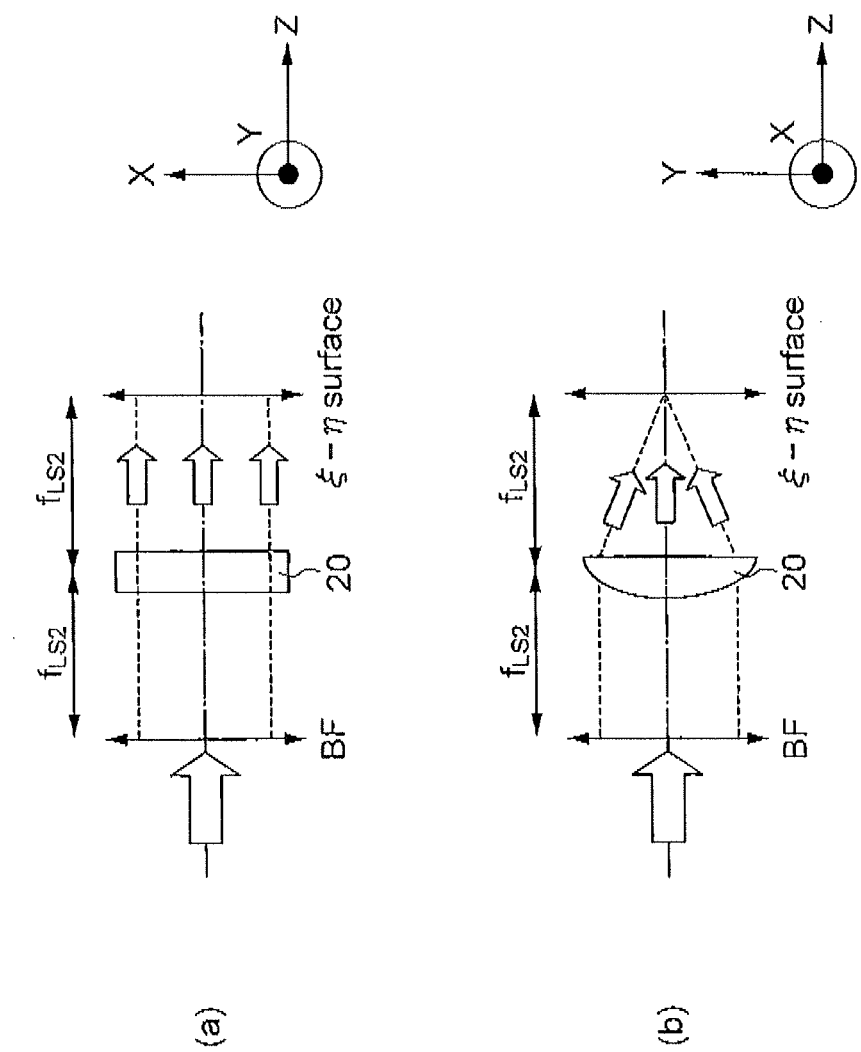
FIG. 7(a) is a side view illustrating an illumination lens 20 which is viewed from a Y axial direction.
FIG. 7(b) is a side view illustrating the illumination lens 20 which is viewed from an X axial direction.

The illumination lens 20 receives the light output from the beam splitter HM1, and emits the light, which has multiple directions in the Y axial direction and a fixed direction in the X axial direction, to the object 2. A cylindrical lens is used as the illumination lens 20. FIG. 7 is a view illustrating an example of the illumination lens 20, in which FIG. 7(*a*) is a side view illustrating the illumination lens 20 viewed in the Y axial direction, and FIG. 7(*b*) is a side view illustrating the illumination lens 20 viewed in the X axial direction. A dotted line shown in FIG. 7 denotes an appearance of an image formation of light by means of the illumination lens 20. $f_{LS2}$ of FIG. 7 indicates a focusing distance of the illumination lens 20. As shown in FIG. 7, the illumination lens 20 has a surface with a curvature disposed in parallel with the Y axial direction and a surface without the curvature disposed in parallel with the X axial direction. Light which is parallel light in the X axial direction and is convergent light in the Y axial direction is emitted to the object 2 by means of the illumination lens 20. In result, the light is emitted from multiple directions in the Y axial direction to the object 2. In FIG. 7, further, a cylindrical lens of a convex lens is shown as the illumination lens 20, but a cylindrical lens of a concave lens may be used as the illumination lens 20. In this case, light which is the parallel light in the X axial direction and divergent light in the Y axial direction is emitted to the object 2. The incident vector $s_0$ of the convergent light or the divergent light to be output by means of the illumination lens 20 is preferably present in an identical plane $S_0$. The plane surface $S_0$ is a surface formed by a moving direction of the object 2 and the optical axis ζ. Further, the observation device 1 of the embodiment may have no illumination lens 20, and light which is the parallel light in the X axial direction and the convergent light or the divergent light in the Y axial direction may be emitted from the light source section 10.

The modulation section 40 includes a first modulator 41 and a second modulator 42. The first modulator 41 and the second modulator 42 are, for example, acousto-optic device. The first modulator 41 diffracts the light output from the light source section 10 through a first modulation signal so as to output the diffracted light to the second modulator 42. The second modulator 42 diffracts the light output from the first modulator 41 through a second modulation signal so as to output the diffracted light to the mirror M1. The light output from the second modulator 42 is reflected by the mirrors M1 and M2 in sequence, and is output to the beam splitter HM2. On the other hand, the modulator 40 may be disposed in a light path of the first light.

A frequency of the first modulation signal provided to the first modulator 41 is slightly different from a frequency of the second modulation signal provided to the second modulator 42. For example, the first modulation frequency is 40 MHz, and the second modulation frequency is 40.000010 MHz. Therefore, a difference Ω between them is 10 Hz. The first modulation signal and the second modulation signal are sine waves, respectively. Further, the modulation section 40 must not be constituted of two modulators such as the first modulator 41 and the second modulator 42. That is, the modulator 40 may have a function of performing a frequency transition of the optical frequency by a desired frequency Ω (hereinafter, referred to as a modulation frequency Ω), and the modulation section 40 may be constituted of one modulator, or three or more modulators.

Figure 8:
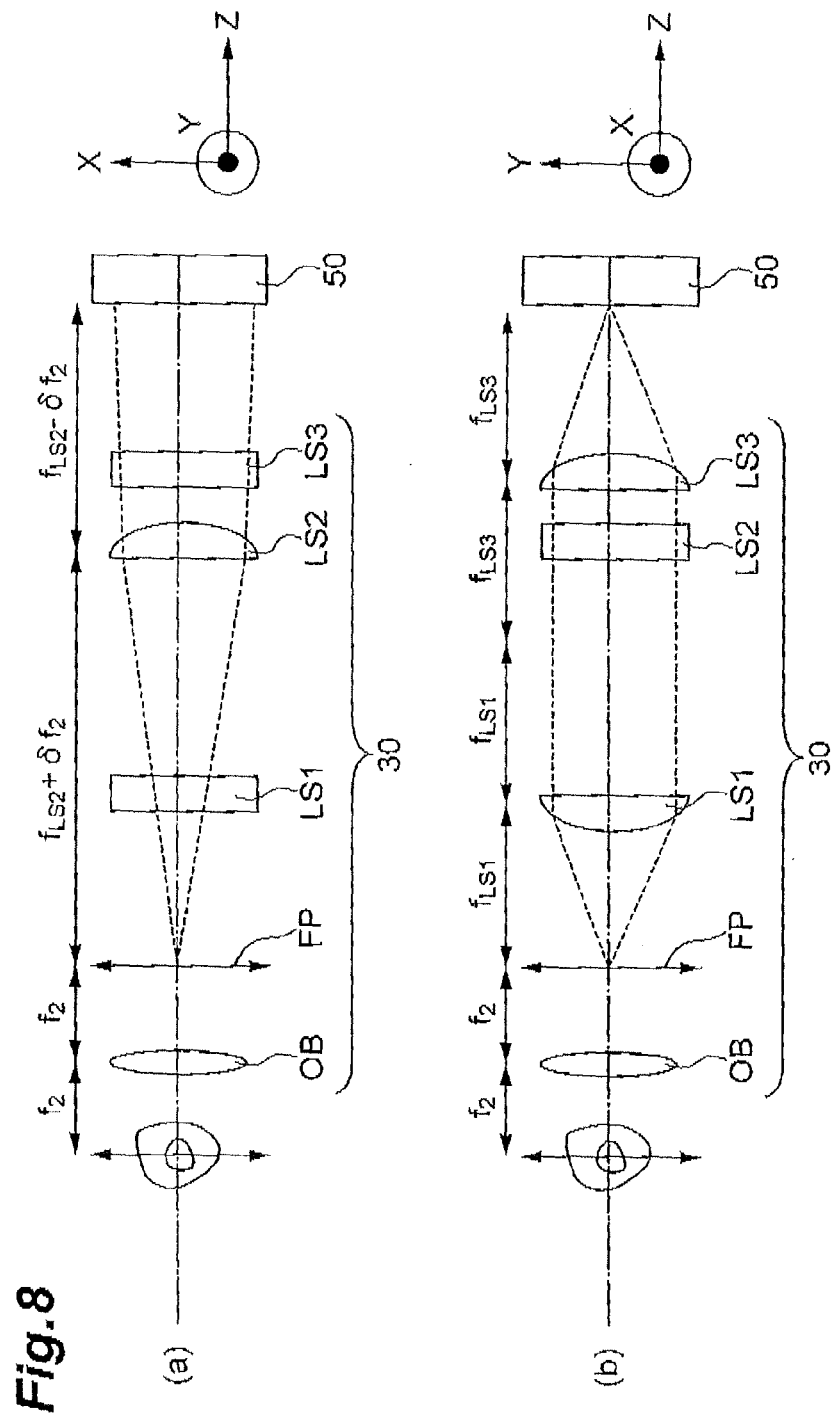
FIG. 8 is a view illustrating a configuration of a condensing lens 30 according to the first placement example.

The condensing lens 30 inputs scattered waves generated in the object 2 by an emission of the light output from the illumination lens 20, so as to form a Fresnel diffraction image in the X axial direction and a Fraunhofer diffraction image in the Y axial direction on a light receiving surface of the detection section 50. The condensing lens 30 outputs the light to the beam splitter HM2. The configuration of the condensing lens 30 is shown in FIG. 8. FIG. 8(*a*) is a side view illustrating the condensing lens 30 which is viewed from the Y axial direction, and FIG. 8(*b*) is a side view illustrating the condensing lens 30 which is viewed from the X axial direction. A dotted line shown in FIG. 8 denotes an appearance of an image formation of light by means of the condensing lens 30. As shown in FIG. 8, the condensing lens 30 includes four lenses such as a lens OB, a lens LS1, a lens LS2 and a lens LS3.

The lens OB is an objective lens which has a numerical aperture NA=0.45 with twenty-times magnification. A back focal plane of the lens OB is referred to as FP. The lens LS1 is a lens which has no curvature in the X axial direction and has a curvature in the Y axial direction. The lens LS2 is a lens which has a curvature in the X axial direction but has no curvature in the Y axial direction. The lens LS3 is a lens which has no curvature in the X axial direction but has a curvature in the Y axial direction. The Y axial directions of the lenses LS1 and LS3 form a 4f optical system. The 4f optical system is an optical system in which a back focal plane of the lens LS1 is identical to a previous focal plane of the lens LS3, and an image on the previous focal plane of the lens LS1 is formed on the back focal plane of the lens LS3. The lens LS2 is disposed on a plane different from the back focal plane of the lens LS1 and different from the front focal plane of the lens LS3. As shown in FIG. 8(*a*), with respect to the X axial direction, the condensing lens 30 forms not the Fraunhofer diffraction image surface or the image formation surface but a Fresnel diffraction image surface on the light receiving surface of the detection section 50 through the lens LS2 by using the light output from the lens OB. As shown in FIG. 8(*b*), further, with respect to the Y axial direction, the condensing lens 30 forms the Fraunhofer diffraction surface on the receiving light surface of the detection section 50 by making the light output from the back focal plane of the lens OB be parallel light through the lens LS1 and converging the parallel light through the lens LS3. By interposing the condensing lens 30 between the object 2 and the detection section 50, the light among the scattered lights from the object 2, which has a different incident angle $\theta_0$ and an identical scattered angle $\theta'$, is condensed at a point of the light receiving surface of the detection section 50.

The beam splitter HM2 introduces the light (object light) arrived from the condensing lens 30 and the light (reference light) arrived from the modulation section 40 by interposing the mirror M1 and M2 into the light receiving surface of the detection section 50, and makes both lights to be subjected to a heterodyne interference on the light receiving surface of the detection section 50. The frequency of the light output from the modulation section 40 and incident to the light receiving surface of the detection section 50 corresponds to $\omega_0 + \Omega$. The $\Omega$ is a difference frequency between the first modulation frequency and the second modulation frequency. The object light and the reference light are subjected to the heterodyne interference on the light receiving surface of the detecting section 50, and the detecting section 50 observes interference beat signals of the object light and the reference light.

The detection section 50 is disposed on a predetermined plane such that scattered light having an identical scattering angle enters at an identical position, and outputs data temporally changing at a frequency corresponding to an amount of Doppler shift of light that reaches at each position on the predetermined plane, for each position in the first direction and the second direction, at each times. The detection section 50 is a two-dimensional optical detector which detects the light arrived at the light receiving surface thereof and outputs a signal corresponding to the detected light, through a pixel configuration arranged in parallel in the X axial direction and the Y axial direction. The receiving surface of the detection section 50 is disposed on a surface where the Fresnel diffraction image of the object 2 is formed in the first direction by the condensing lens 30, and the Fraunhofer diffraction image of the object 2 is formed in the second direction. Here, a direction which is parallel within the plane surface $S_0$ and perpendicular to a Z axis is defined as a u direction, and a direction which is parallel within the plane surface $S_0$ and perpendicular to the u direction is defined as a v direction. Further, an axis perpendicular to the X axis and the Y axis is defined as the Z axis.

Figure 9:
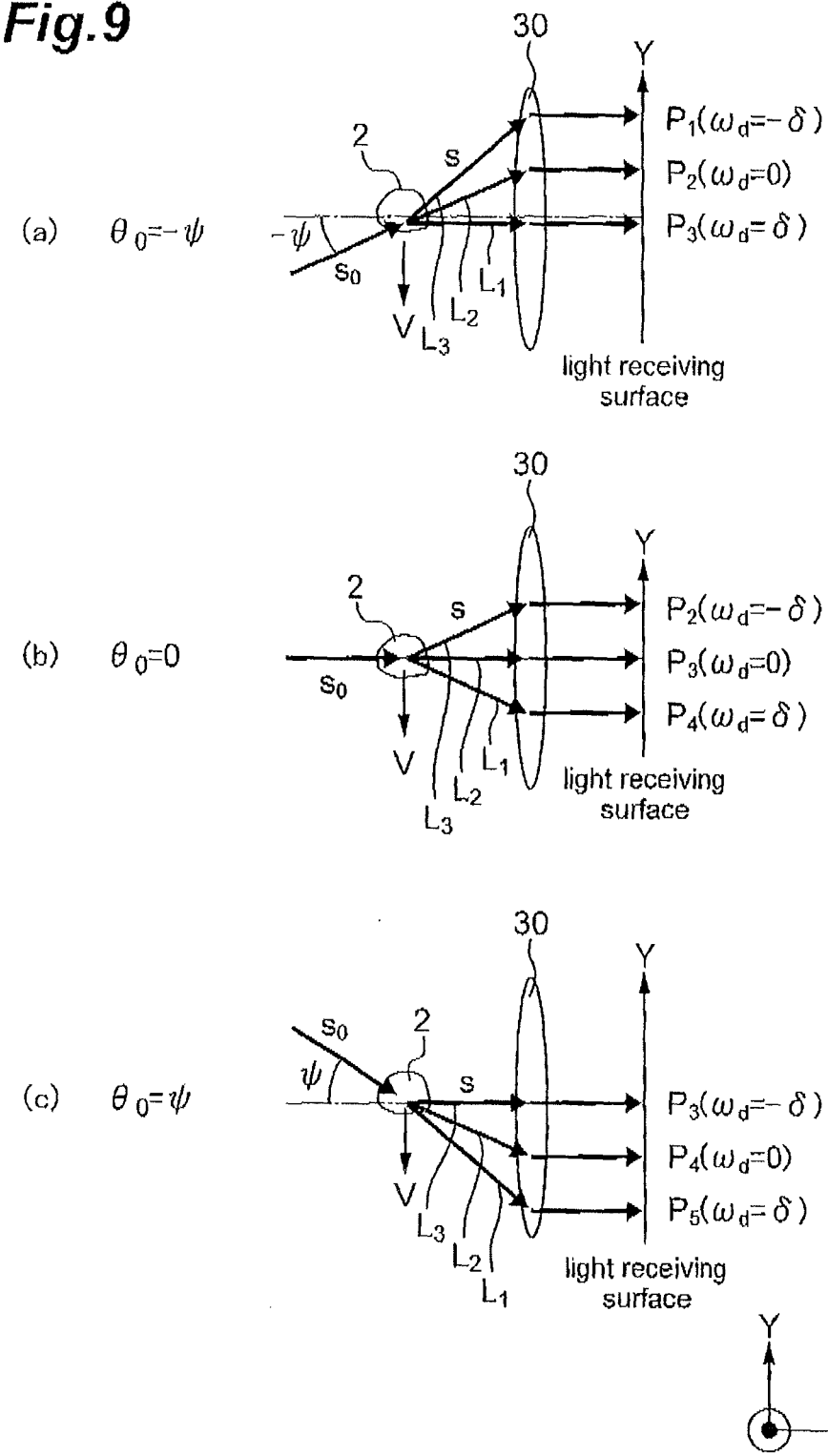
FIG. 9 is a view schematically illustrating lights incident to a detection section 50 by interposing the condensing lens 30.

FIG. 9 is a view schematically illustrating lights incident to the detection section 50 by interposing the condensing lens 30. In FIG. 9, with respect to the Y axis direction, the object 2 is disposed on the previous focal plane of the condensing lens 30, and the light receiving surface of the detection section 50 is disposed on the back focal plane of the condensing lens 30.

FIG. 9(*a*) is a view illustrating an appearance of scattered lights $L_1$, $L_2$ and $L_3$ which are formed at the object 2 by the incident light and are incident to the detection section 50, by paying attention to the incident light of which the incident angle $\theta_0$ is $-\psi$. If the object 2 moves in a −Y axial direction, the incident light $L_0$ with an incident vector component of a direction opposite to the moving direction of the object 2 has a high optical frequency ($\omega_{d1} = \delta$) of the scattered light caused by the object 2 by means of the first Doppler Effect. The object 2 scatters the light subjected to the first Doppler Effect. The scattered light $L_1$ which has no scattering directional vector component in a direction parallel with the moving direction of the object 2 is not subjected to the second Doppler Effect ($\omega_{d2}2 = 0$). Therefore, in the optical frequency of the scattering light $L_1$, only a frequency transition by the first Doppler Effect is observed ($\omega_d = \delta + 0 = \delta$). The scattered light $L_2$ with the vector component in a scattering direction opposite to the moving direction of the object 2 has a low optical frequency due to the second Doppler Effect ($\omega_{d2} = -\delta$). Therefore, the optical frequency of the scattered light $L_2$ is not changed by the first Doppler Effect and the second Doppler Effect ($\omega d = \delta - \delta = 0$). The scattered light $L_3$ with the vector component in a scattering direction opposite to the moving direction of the object 2 is subjected to the frequency modulation by the Doppler shift and has a low optical frequency ($\omega_{d2} = -2\delta$). Therefore, the optical frequency of the scattered light $L_3$ is lowered by the first Doppler Effect and the second Doppler Effect ($\omega_d = \delta - 2\delta = -\delta$). These scattered lights $L_1$, $L_2$ and $L_3$ arrive at positions $P_1$, $P_2$ and $P_3$ of each detection section 50 through the condensing lens 30.

FIG. 9(*b*) is a view illustrating an appearance of the scattered lights $L_1$, $L_2$ and L which are formed by the incident light in the object 2 and are incident to the detection section 50, by paying attention to the incident light of which the incident angle $\theta_0$ is 0. If the object 2 moves in a −Y axial direction, the incident light $L_0$ with no an incident vector component of a direction parallel with the moving direction of the object 2 is not subjected to the first Doppler Effect and has an optical frequency of the scattered light, which is caused by the object 2, identical to the incident light ($\omega_{d1} = 0$). The object 2 scatters the light which is not subjected to the first Doppler Effect. The scattered light $L_1$ with the vector component in a scattering direction identical to the moving direction of the object 2 is subjected to the frequency modulation by the Doppler shift and has a high optical frequency ($\omega_{d2} = +\delta$). Therefore, the optical frequency of the scattered light $L_1$ gets higher by the first Doppler Effect and the second Doppler Effect ($\omega_d = 0 + \delta = +\delta$). The scattered light $L_2$ having no vector component of the scattering direction parallel to the movement direction of the object 2 has an unchanged optical frequency ($\omega_{d2}=0$). Therefore, the optical frequency of the scattered light $L_2$ is not changed by the first Doppler Effect and the second Doppler Effect ($\omega_d=0-0=0$). The scattered light $L_3$ with the vector component in a scattering direction opposite to the moving direction of the object 2 is subjected to the frequency modulation by the Doppler shift and has a low optical frequency ($\omega_{d2}=-\delta$). Therefore, the optical frequency of the scattered light $L_3$ is lowered by the first Doppler Effect and the second Doppler Effect ($\omega_d=0-\delta=-\delta$). These scattered lights $L_1$, $L_2$ and $L_3$ arrive at positions $P_2$, $P_3$ and $P_4$ of each detection section 50 through the condensing lens 30.

FIG. 9(c) is a view illustrating an appearance of the scattered lights $L_1$, $L_2$ and $L_3$ which are formed by the incident light in the object 2 and are incident to the detection section 50, by paying attention to the incident light of which the incident angle $\theta_0$ is $\psi$. If the object 2 moves in a -Y axial direction, the incident light $L_0$ with an incident vector component of a direction identical to the moving direction of the object 2 has a lower optical frequency ($\omega_{d1}=-\delta$) than the incident light caused by the object 2 by means of the first Doppler effect. The object 2 scatters the light subjected to the first Doppler Effect. The scattered light $L_1$ with the vector component in a scattering direction identical to the moving direction of the object 2 is subjected to the frequency modulation by the Doppler Effect and has a high optical frequency ($\omega_{d2}=2\delta$). Therefore, the optical frequency of the scattered light $L_1$ gets higher by the first Doppler Effect and the second Doppler Effect ($\omega_d=\delta+2\delta=\delta$). The scattered light La with the vector component in a scattering direction identical to the moving direction of the object 2 has a high optical frequency modulated by the Doppler Effect ($\omega_{d2}=\delta$). Therefore, the optical frequency of the scattered light $L_2$ is not changed by the first Doppler Effect and the second Doppler Effect ($\omega_d=-\delta+\delta=0$). The scattered light $L_3$ having no vector component of the scattering direction parallel to the movement direction of the object 2 has an unchanged optical frequency ($\omega_{d2}=0$). Therefore, the optical frequency ($\omega_d=-\delta+0=-\delta$) of the scattered light $L_3$ is lowered by the first Doppler Effect and the second Doppler Effect. These scattered lights $L_1$, $L_2$ and $L_3$ arrive at positions $P_3$, $P_4$ and $P_5$ of detection section 50 respectively through the condensing lens 30.

At positions $P_n$ (n=1~5) of the detection section 50, a signal in which a frequency is transited by a frequency $\omega_d$ by the Doppler Effect of the scattered lights $L_1$, $L_2$ and $L_3$ with reference to a frequency $\Omega$ is observed as an interference beat signal. The amplitude and the phase (i.e., complex amplitude value) of each scattered angle are obtained by recording the interference beat signal for a predetermined period and calculating the amplitude and the phase of the interference beat signal.

Figure 10:
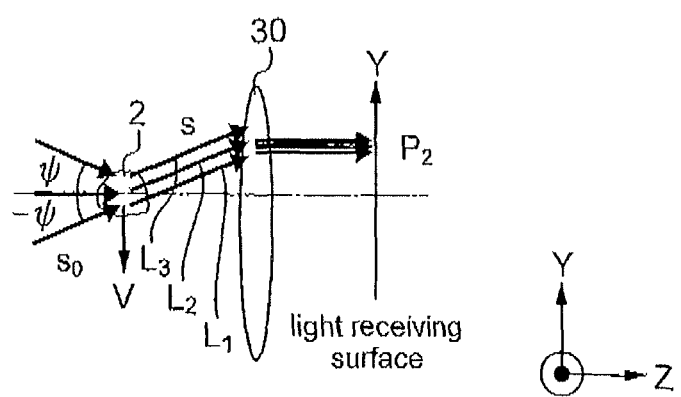
FIG. 10 is a view schematically illustrating an appearance of scattered lights caused by incident lights with three incident angles, which are incident to the detection section 50.

FIG. 10 is a view schematically illustrating an appearance of the scattered lights caused by the incident lights with three incident angles $\theta_0=-\psi, 0, \psi$, which are incident to the detection section 50. Although the scattered lights with different angles $\theta'$ are formed for each incident angle $\theta_0$, in FIG. 10, the scattered lights $L_1$, $L_2$ and $L_3$ with a specific scattered angle $\theta'$ are shown. The scattered lights $L_1$, $L_2$ and $L_3$ with an identical scattered angle $\theta'$ arrive at the same position $P_2$ by interposing the condensing lens 30. These scattered lights $L_1$, $L_2$ and $L_3$ are subjected to different frequency transitions by the Doppler Effect, respectively, because they have different incident angles $\theta_0$. In result, the frequencies of the scattered lights $L_1$, $L_2$ and $L_3$ are different from one another. Accordingly, although the scattered lights caused by the incident lights with different incident angles $\theta_0$ arrive at the same pixel of the detection section 50, the frequencies can be distinguished from the frequency transition of the scattered lights by the Fourier transform and the like, thereby extracting a signal at each incident angle.

As described above, the lights among the scattered lights from the object 2, which have a different incident angle $\theta_0$ and the same scattered angle $\theta'$, are converged by means of the condensing lens 30 at a point (x, y) of the light receiving surface of the detection section 50. Here, the point (x, y) is a coordinate of a pixel of the detection section 50 established as parallel in two-dimensions. That is, the scattered angle $\theta$ of the scattering light observed at the point (x, y) is a fixed value. Further, since the scattered light caused by the object 2 is subjected to the frequency transition of the frequency $\omega_d$ in Equation (4), the interference strength detected at the point (x, y) through an optical heterodyne interference measurement is changed to the frequency $\omega_d$. Because the scattered light caused by different incident angles $\theta_0$ arrives at the point (x, y), beat signals overlapped different frequencies subjected to the frequency transition according to the incident angle $\theta_0$ are observed at the point (x, y). If the Fourier transform with respect to a time variable t is performed for these beat signals, the Doppler shift frequency $\omega_d$ involved in the beat signals can be known. Since the scattered angle $\theta$ of Equation (4) is a fixed value at the point (x, y), a specific relation between the Doppler shift frequency (ad and the incident angle $\theta_0$ is present as shown in Equation (5). Therefore, the complex amplitude image at the incident angle can be obtained by a simple transform. Further, $V_Y$ is a Y axial component of a velocity of the object, and a modulation frequency $\Omega$ is set to 0 for a brief description.

[Equation (5)]

$$\omega_d = \frac{2\pi}{\lambda}(s-s_0) \cdot V \qquad (5)$$
$$= \frac{2\pi V_Y}{\lambda}(\sin\theta' - \sin\theta_0)$$

Further, when a maximum incident angle is defined as $\theta_{0max}$ and a maximum light receiving scattering angle is defined as $\theta_{max}$, a maximum Doppler shift frequency Bw can be expressed by Equation (6). In Equation (6), $\lambda$ is a wavelength of the incident light, and V is a velocity of the object. Accordingly, the Doppler shift frequency band becomes 2Bw.

[Equation (6)]

$$B_w = \frac{2\pi}{\lambda}|V|(|\sin\theta_{0max}| + |\sin\theta_{max}|) \qquad (6)$$

In the embodiment, a projective incident angle $\theta_0'$ to a Y-Z plane is identical to the incident angle $\theta_0$ because the incident unit vector so has no an X axial component. If the unit incident vector so has an X axial component, the projective incident angle $\theta_0'$ is substituted for $\theta_0$ of Equation (5).

The arithmetic operation section 60 performs a one-dimensional Fourier transform with respect to a time variable for a data having a position in first-direction on the predetermined plane, a position in the second-direction on the predetermined plane, and a time as variables and extracting data having an identical incident angle on the basis of the Doppler effect from the Fourier-transformed data.

Figure 11:
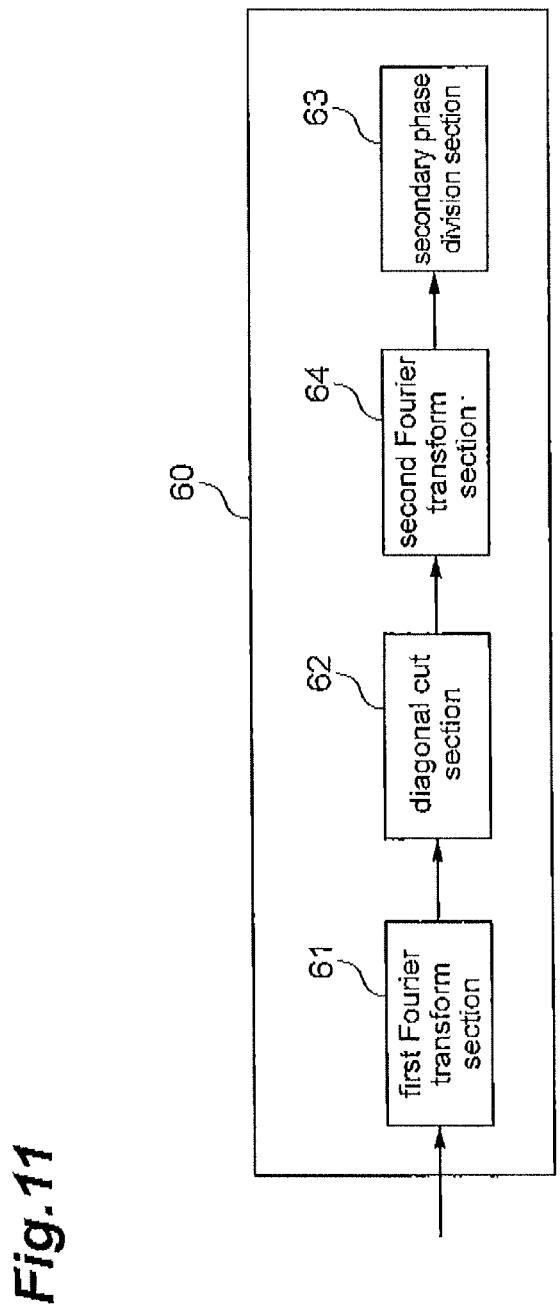
FIG. 11 is a block diagram illustrating a configuration of an arithmetic operation section 60 according to the first placement example.

As shown in FIG. 11, the arithmetic operation section 60 includes a first Fourier transform section 61, a diagonal cut section (extraction section) 62, a second Fourier transform section 64 and a second phase division section 63. The first Fourier transform section 61 performs one dimensional Fourier transform with respect to the time variable for the interference strength image acquired by the detection section 50. The diagonal cut section 62 extracts data having the same incident angle from the one dimensional Fourier transformed data on the basis of the Doppler Effect. The second Fourier transform section 64 performs the one dimensional Fourier transform with respect to a variable x for the data output from the diagonal cut section 62. The second phase division section 63 divides the data output from the second Fourier transform section 64 by a second phase H(x). On the other hand, the first Fourier transform section 61, the diagonal cut section 62, the second Fourier transform section 64 and the secondary phase division section 63 may be disposed in a desired sequence by replacement with one another while the secondary phase division section 63 is disposed in the rear of the second Fourier transform section 64.

Figure 12:
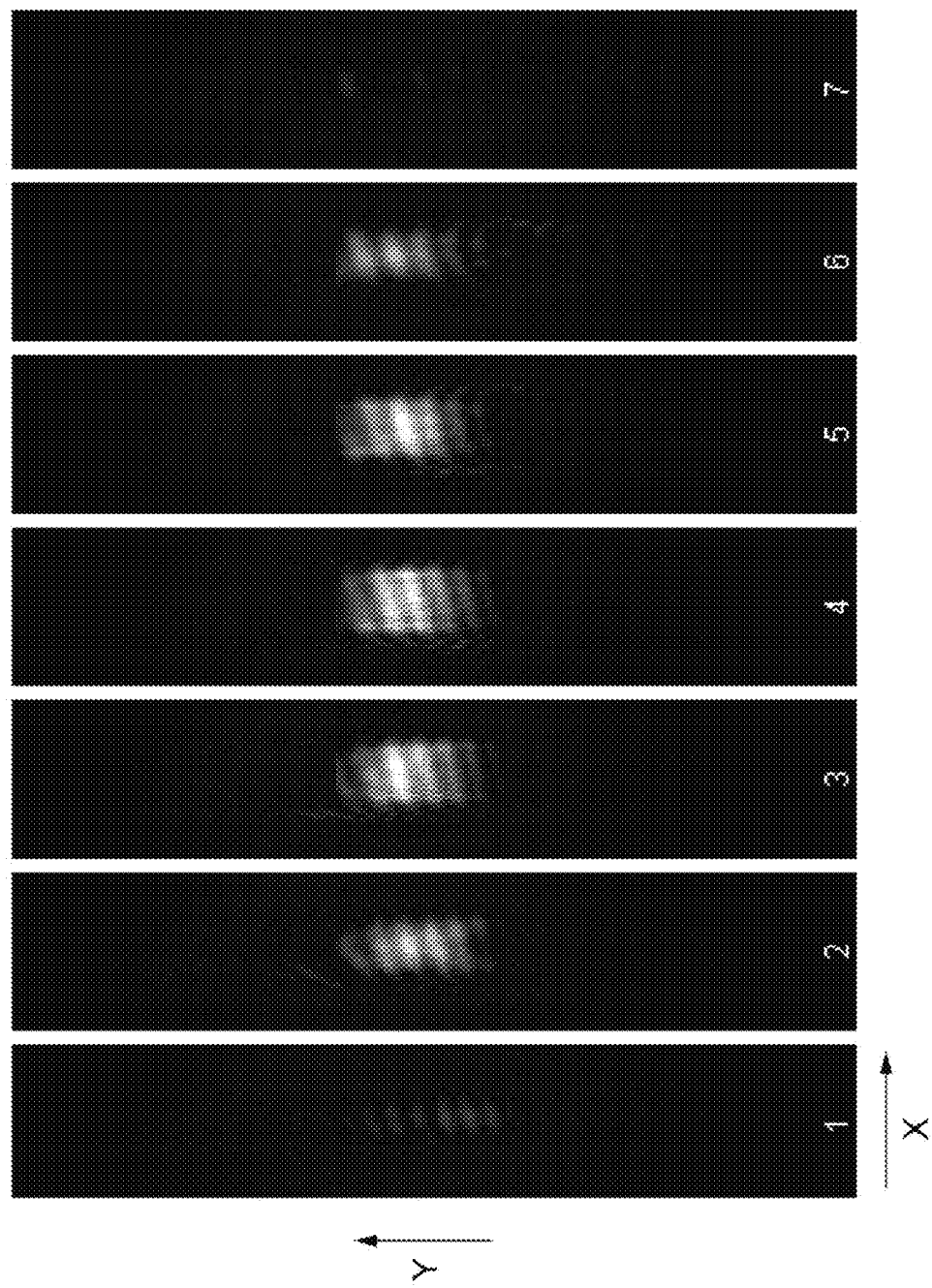
FIG. 12 is a view illustrating an example of an interference strength image i acquired by the detection section 50.

The interference strength image acquired by the detection section 50 is shown as i (x, y; η). In FIG. 12, an example of the interference strength image i (x, y; η) acquired by the detection section 50 is shown. In the example of FIG. 12, a circular opening with a diameter of 25 μm, which moves at a velocity of 10 μm/s is used as the object 2. Further, a CCD camera to output images of 180 sheets with 640×128 pixels and a size of one pixel of 7.4×7.4 μm is used as the detection section 50. In the interference strength image i (x, y; η) shown in FIG. 12, it may be known that a distance of interference fringes varies from a number 1 to a number 7.

Figure 13:
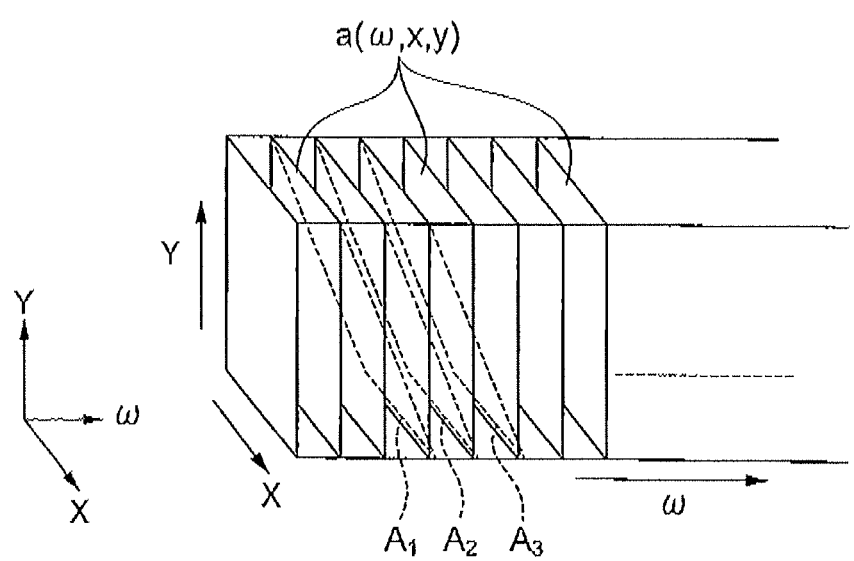
Figure 14:
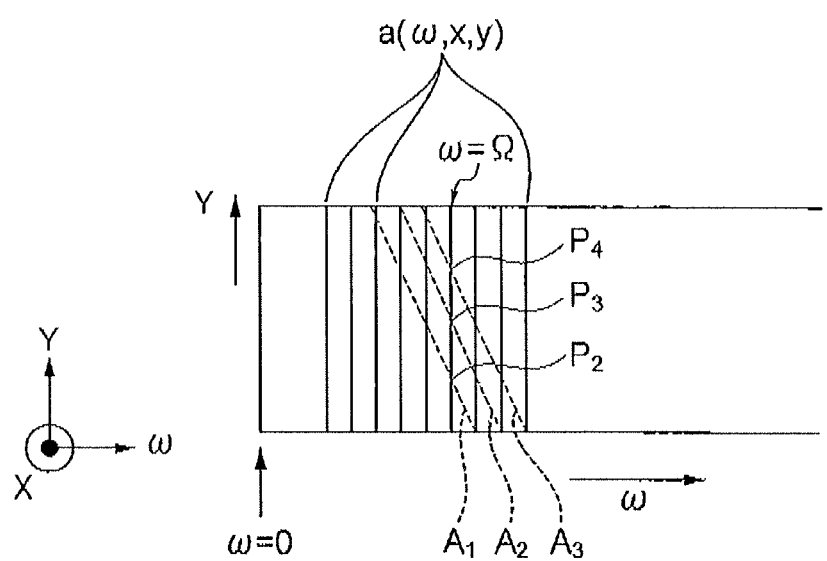
FIG. 14 is a view schematically illustrating the complex amplitude image a of FIG. 13, which is viewed from an X axial direction.

If the object 2 moves at a velocity V, the position of the object 2 may be indicated by η=Vt. Here, t is a time. The interference strength image i (x, y; η) may be shown as i (t, x, y) because the object 2 moves at a constant velocity. The first Fourier transform section 61 obtains a frequency dependence complex amplitude image a (ω, x, y) by performing the Fourier transform with respect to a time variance t for the interference strength image i (t, x, y). Here, ω is a time frequency. FIG. 13 schematically shows the frequency dependence complex amplitude image a (ω, x, y) obtained by the Fourier transform. FIG. 14 is a view illustrating the complex amplitude image a of FIG. 13, which is viewed from an X axial direction. As shown in FIGS. 13 and 14, because an X-Y plane surface is arranged in parallel with the paper surface for the X axial direction, the frequency dependence complex amplitude image will be described in two-dimensions of –Y planes surface for a brief description.

The scattering angle θ' in Equation (5) is a value determined based on a physical arrangement of the object 2, the condensing lens 30 and the detection section 50, and is a constant value during a measurement. If a focal distance of the Y axial direction of the condensing lens 30 is $f_Y$, the scattering angle θ' is expressed by Equation (7) using the focal distance $f_Y$ of the condensing lens 30 and the light receiving coordinate (x, y) when the back focal plane of the Y axial direction of the condensing lens 30 is identical to the light receiving surface of the detection section 50.

[Equation (7)]

$$\theta' = \tan^{-1}(y/f_Y) \tag{7}$$

Here, since $f_Y$ is already known, the scattering angle θ' is a projective scattering angle determined by only a variable y. If the scattering angle θ' of Equation (7) is substituted for Equation (5) and a heterodyne frequency Ω is evaluated, a time frequency ω output from the first Fourier transform section 61 is expressed by Equation (8) as follows.

[Equation (8)]

$$\omega - \Omega = \frac{2\pi V_Y}{\lambda}\left(\frac{y}{f_Y} - \sin\theta_0\right) \tag{8}$$

In Equation (8), if $\alpha = 2\pi V_Y/(\lambda f_Y)$, and $\beta = -2\pi V_Y/\lambda$, Equation (8) will be expressed like Equation (1) as follows. That is, Equation (1) is a linear function of y and ω. In Equation (1), in the case that a term of β sin θ$_0$ is constant, the complex amplitude value is a complex amplitude value in the light receiving surface when light is emitted to the object at a fixed incident angle θ$_0$.

[Equation (1)]

$$\omega - \Omega = \alpha y + \beta \sin\theta_0 \tag{1}$$

The diagonal cut section 62 extracts a plane surface satisfying Equation (1) from the frequency dependence complex amplitude image a (ω, x, y). As described above, the image extracted by the diagonal cut section 62 is an incident dependence complex amplitude image A (θ$_0$, x, y). FIGS. 13 and 14 schematically show the mathematical operation. Referring to FIGS. 13 and 14, an inclined surface indicated by a dotted line is the incident angle dependence complex amplitude image A (θ$_0$, x, y) extracted by the diagonal cut section 62. The incident angle dependence complex amplitude image A (θ$_0$, x, y) is extracted so as to traverse a direction of a frequency ω and a Y axial direction for the plural sheets of complex amplitude images a (ω, x, y). As shown in FIG. 14, element data of the incident angle dependence complex amplitude image A (θ$_0$, x, y) becomes element data of a linear function in a ω-Y plane surface as expressed in Equation (1).

Equations (1) and (8) induced from Equations (5) and (7) make sin θ' approximate to θ' and θ' approximate to y/f$_Y$. By using the approximation, the incident angle dependence complex amplitude image A (θ$_0$, x, y) becomes a flat surface. If the approximation is not used, the incident angle dependence complex amplitude image A (θ$_0$, x, y) becomes a curved surface.

Further, with respect to the approximation of θ' to y/f$_Y$, the approximation value can be close to a true value by using a fθ lens in the Y axial direction of the condensing lens 30. In the case that a focal distance is f and incident light with angle θ reaches a position y of a back focal plane of a lens from a previous focal point, a conventional lens may indicate a relation of an incident angle θ and a position y as y=f tan θ while the fθ lens indicates the relation as y=fθ. In this case, the diagonal cut section 62 extracts a flat surface satisfying Equation (3) from the frequency dependence complex amplitude image a (ω, x, y).

[Equation (3)]

$$\omega - \Omega = \frac{2\pi V_Y}{\lambda}\left[\sin\left(\frac{y}{f_Y}\right) - \sin\theta_0\right] \tag{3}$$

In the placement example, the light receiving surface of the detection section 50 is arranged on a surface in which the Fresnel diffraction image of the object 2 is formed in the X axial direction and the Fraunhofer diffraction image of the object 2 is formed in the Y axial direction. When the detection section 50 is disposed on the Fresnel diffraction image surface, the image is blurred so that the secondary phase H(x) is shown. In the placement example, accordingly, the secondary phase H(x) is shown in the X axial direction.

After performing one dimensional Fourier transform with respect to a variable x for the incident angle dependence complex amplitude image A ($\theta_0$, x, y) obtained by the diagonal cut section 62, the secondary phase division section 63 divides the incident angle dependence complex amplitude image A ($\theta_0$, x, y) by the secondary phase H(x). Herewith, the secondary phase division section 63 obtains the complex amplitude image from the complex amplitude image obtained in the placement example, such as a case that the light receiving surface of the detection section 50 is arranged on a surface in which the Fraunhofer diffraction image of the object 2 is formed in the X axial direction and the Fraunhofer diffraction image of the object 2 is formed in the Y axial direction. The secondary phase H(x) is a value determined by the position where the detection section 50 is disposed. The secondary phase H(x) is expressed by Equation (9). In Equation (9), $\gamma$ is a constant.

[Equation (9)]

$$H(x) = \exp(\gamma x^2) \quad (9)$$

The secondary phase division section 63 performs one dimensional Fourier transform with respect to a variable x for the incident angle dependence complex amplitude image A ($\theta_0$, x, y) obtained by Equation (1), and divides the incident angle dependence complex amplitude image A by the secondary phase H(x) of Equation (9) so as to obtain the incident angle dependent complex amplitude image A without a blur. As described above, the observation device 1 of the placement example obtains the incident angle dependence complex amplitude image A.

Second Placement Example

In turn, a second placement example of the embodiment will be described. In the second placement example, the light receiving surface of the detection section 50 is arranged on a surface in which the Fraunhofer diffraction image of the object 2 is formed in the X axial direction and the Fraunhofer diffraction image of the object 2 is formed in the Y axial direction. On this account, in the present placement example, a condensing lens 30A is prepared instead of the condensing lens 30 of the first placement example. Further, in the present placement example, an arithmetic operation section 60A is prepared instead of the arithmetic operation section 60 of the first placement example. Other configurations are identical to those in the first placement example. Hereinafter, only differences from the first placement example will be described, and the description of identification to the first placement example will be omitted.

Figure 15:
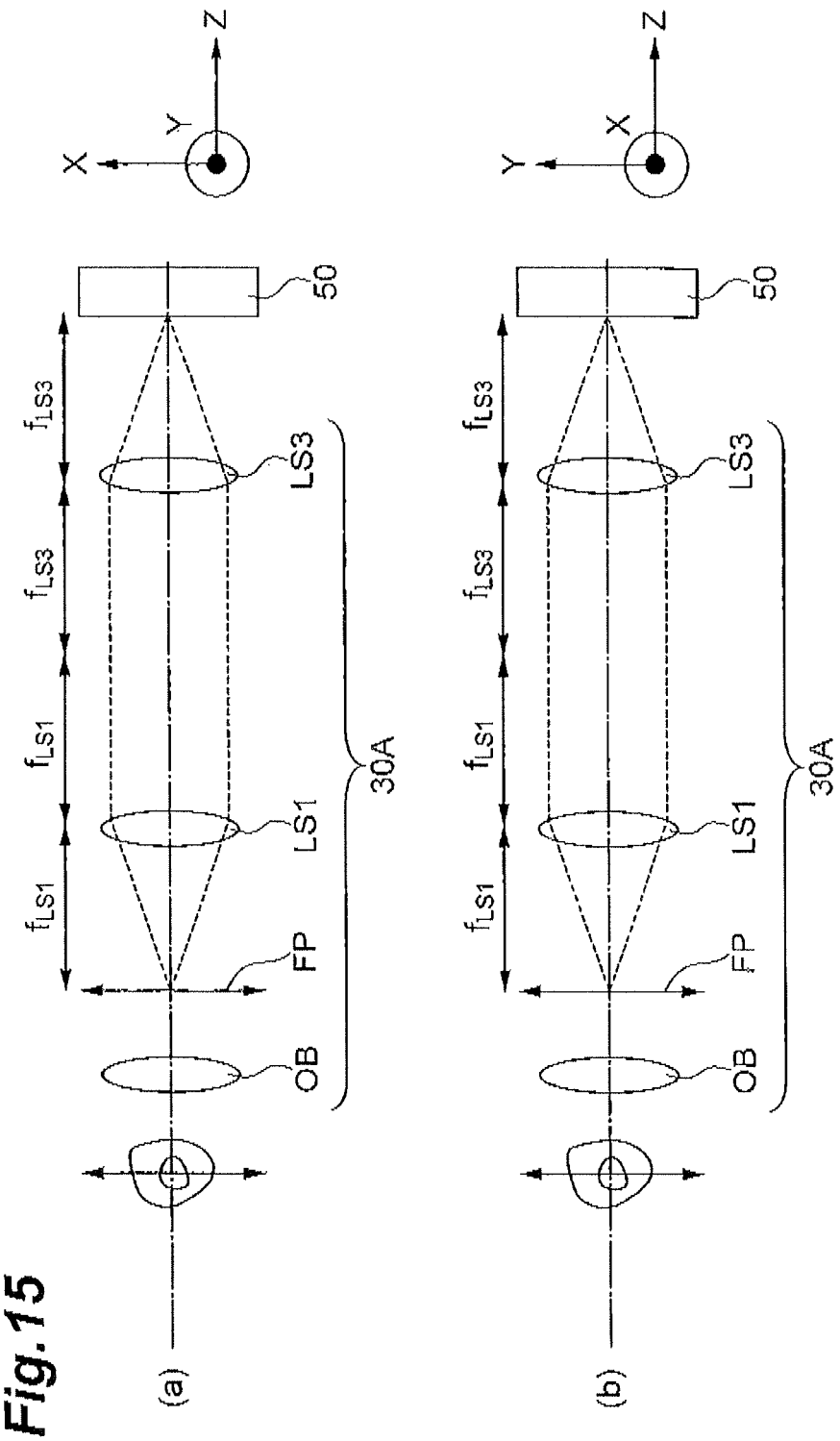
FIG. 15 is a view illustrating a configuration of a condensing lens 30A according to a second placement example.

FIG. 15 shows the condensing lens 30A employed to the placement example. The condensing lens 30A inputs scattered waves generated in the object 2 by an emission of the light output from the illumination lens 20, so as to form an image, which is a Fraunhofer diffraction image in an X axial direction and a Fraunhofer diffraction image in an Y axial direction, on a light receiving surface of the detection section 50. FIG. 15(A) is a side view illustrating the condensing lens 30A which is viewed from the Y axial direction, and FIG. 15(B) is a side view illustrating the condensing lens 30 which is viewed from the X axial direction. A dotted line shown in FIG. 15 denotes an appearance of an image formation of light by means of the condensing lens 30A. As shown in FIG. 15, the condensing lens 30A includes three lenses such as a lens OB, a lens LS1 and a lens LS3.

The lens OB is an objective lens which has a numerical aperture NA=0.45 with twenty-times magnification. A back focal plane of the lens OB is referred to as FP. The lens LS is a lens which has a curvature in the X axial direction and the Y axial direction. The lens LS3 is a lens which has a curvature in the X axial direction the Y axial direction. As shown in FIG. 15(A), with respect to the X axial direction, the condensing lens 30A forms the Fraunhofer diffraction image on the receiving light surface of the detection section 50 by making the light output from the back focal plane of the lens OB be parallel light through the lens LS1 and converging the parallel light through the lens LS3. As shown in FIG. 15(B), further, with respect to the Y axial direction, the condensing lens 30A forms the Fraunhofer diffraction image on the receiving light surface of the detection section 50 by making the light output from the back focal plane of the lens OB be parallel light through the lens LS1 and converging the parallel light through the lens LS3. By interposing the condensing lens 30 between the object 2 and the detection section 50, the light among the scattered lights from the object 2, which has a different incident angle $\theta_0$ and an identical scattering angle $\theta'$, is condensed at a point of the light receiving surface of the detection section 50.

A detection section is disposed on a predetermined plane such that scattered light having the identical scattering angle $\theta'$ enters at an identical position, and outputs a data temporally changing at a frequency corresponding to an amount of Doppler shift of light that reaches at each position on a predetermined plane, for each position in the first direction and the second direction, at each times.

Figure 16:
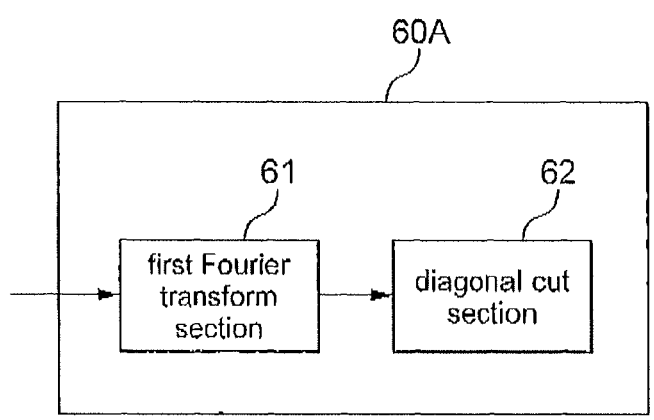
FIG. 16 is a block diagram illustrating a configuration of an arithmetic operation section 60A according to the second placement example.

As shown in FIG. 16, the arithmetic operation section 60A includes the first Fourier transform section 61 and the diagonal cut section 62. However, arithmetic operation section 60A does not include the second Fourier transform section 64 and the secondary phase division section 63. In the present placement example, the light receiving surface of the detection section 50 is disposed on a surface in which the Fraunhofer diffraction image of the object 2 is formed in the X axial direction and the Fraunhofer diffraction image of the object 2 is formed in the Y axial direction. When the detection section 50 is disposed on the Fraunhofer diffraction image, the lenses LS1 and LS3 constituting the lens 30A optically perform one dimensional Fourier transform with respect to the variable x through an operation of a lens having a curvature in the X axial direction, and also the secondary phase H(x) becomes 1. In the placement example, further, it is unnecessary to perform the one dimensional Fourier transform with respect to the variable x by means of the secondary Fourier transform section 64. Moreover, it is unnecessary to divide the secondary phase H(x) by means of the secondary phase division section 63.

The incident angle dependence complex amplitude image A ($\theta_0$, x, y) obtained in the present placement example is identical to the incident angle dependence complex amplitude image A which has no blur and is obtained by dividing incident angle dependence complex amplitude image A ($\theta_0$, x, y) obtained by Equation (1) in the first placement example by the secondary phase H(x) of Equation (9). That is, in the second placement example, an effect by the secondary phase division section 63 is obtained by the optical operation of the condensing lens 30A. On the contrary, in the first placement example, it may be said that the secondary phase division section 63 implements the optical operation of the lens 30A of the second placement example through an arithmetic operation.

Third Placement Example

In turn, a third placement example of the embodiment will be described. In the third placement example, the light receiving surface of the detection section 50 is disposed on a surface in which the image of the object 2 is formed in the X axial direction and the Fraunhofer diffraction image of the object 2 is formed in the Y axial direction. On this account, in the present placement example, a condensing lens 30B is provided instead of the condensing lens 30 of the first placement example and the condensing lens 30A of the second placement example. Further, in the present placement example, an arithmetic operation section 60B is provided instead of the arithmetic operation section 60 of the first placement example and the arithmetic operation section 60A of the second placement example. Other configurations are identical to those of the first placement example and the second placement example. Hereinafter, only differences from the first placement example and the second placement example will be described, and the description of identification to the first placement example and the second placement example will be omitted.

Figure 17:
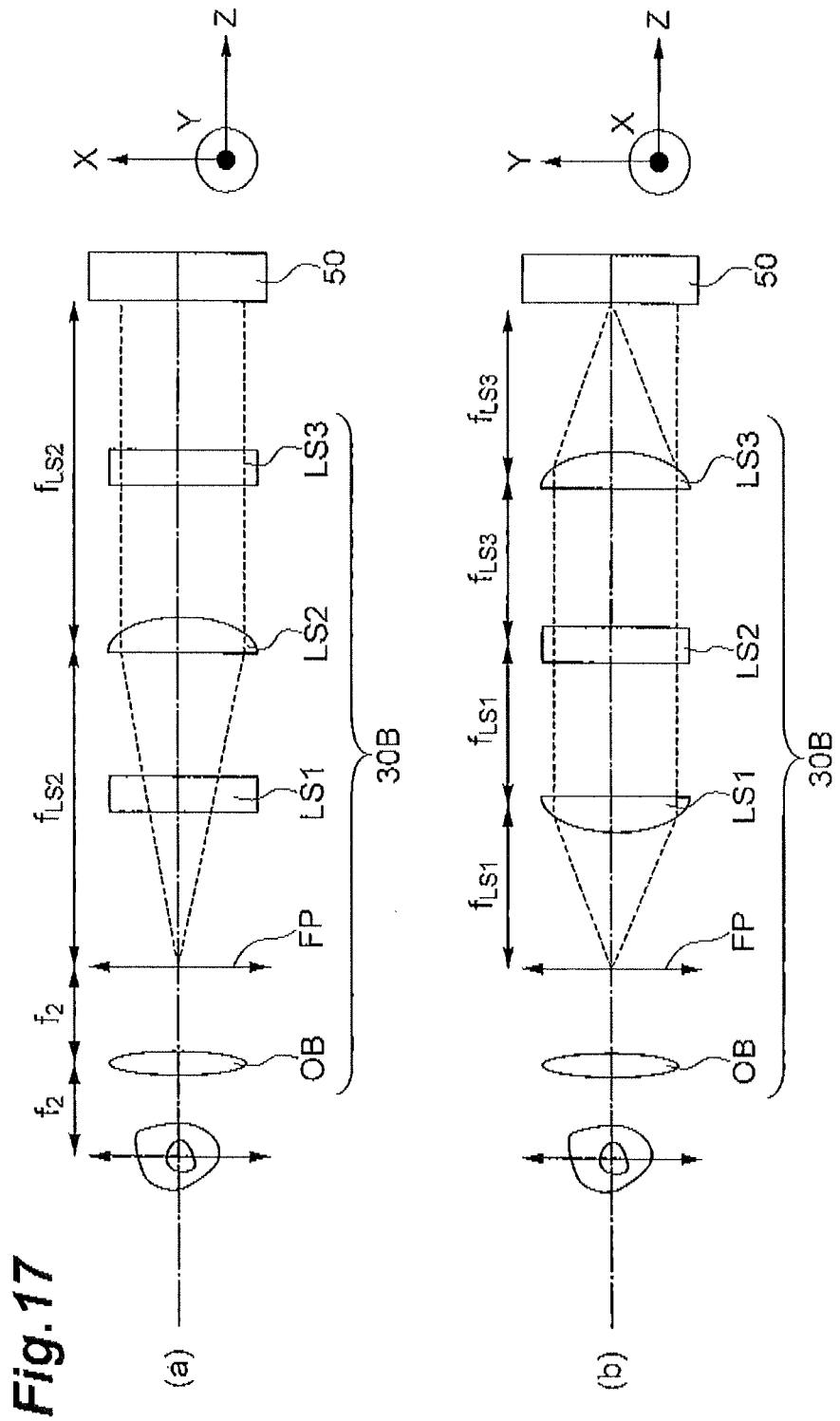
FIG. 17 is a view illustrating a configuration of a condensing lens 30B according to a third placement example.

FIG. 17 shows the condensing lens 30B employed to the present placement example. The condensing lens 30B inputs scattered waves generated in the object 2 by an emission of the light output from the illumination lens 20, so as to form an image, which is an objective image of the object 2 in an X axial direction and a Fraunhofer diffraction image in an Y axial direction, on a light receiving surface of the detection section 50. FIG. 17(A) is a side view illustrating the condensing lens 30B which is viewed from the Y axial direction, and FIG. 17(B) is a side view illustrating the condensing lens 30B which is viewed from the X axial direction. A dotted line shown in FIG. 17 denotes an appearance of an image formation of light by means of the condensing lens 30B. As shown in FIG. 17, the condensing lens 30B includes four lenses such as a lens OB, a lens LS1, a lens LS2 and a lens LS3.

The lens OB is an objective lens which has a numerical aperture NA=0.45 with twenty-times magnification. A back focal plane of the lens OB is defined as FP. The lens LS1 is a lens which has no curvature of the X axial direction and has a curvature of the Y axial direction. The lens LS2 is a lens which has a curvature of the X axial direction but has no curvature of the Y axial direction. The lens LS3 is a lens which has no curvature of the X axial direction but has a curvature of the Y axial direction. The lens LS2 is disposed on a back focal plane of the lens LS1 and the previous focal plane of the lens LS3. As shown in FIG. 17(A), with respect to the X axial direction, the condensing lens 30B forms the objective image on the receiving light surface of the detection section 50 by making the light output from the back focal plane of the lens OB be parallel light through the lens LS2. As shown in FIG. 17(B), further, with respect to the Y axial direction, the condensing lens 30B forms the Fraunhofer diffraction image on the receiving light surface of the detection section 50 by making the light output from the back focal plane of the lens OB be parallel light through the lens LS1 and converging the parallel light through the lens LS3. By interposing the condensing lens 30B between the object 2 and the detection section 50, the light among the scattered lights from the object lens 2, which has the different incident angle $\theta_0$ and the identical scattering angle $\theta'$, is condensed at a point of the light receiving surface of the detection section 50.

Figure 18:
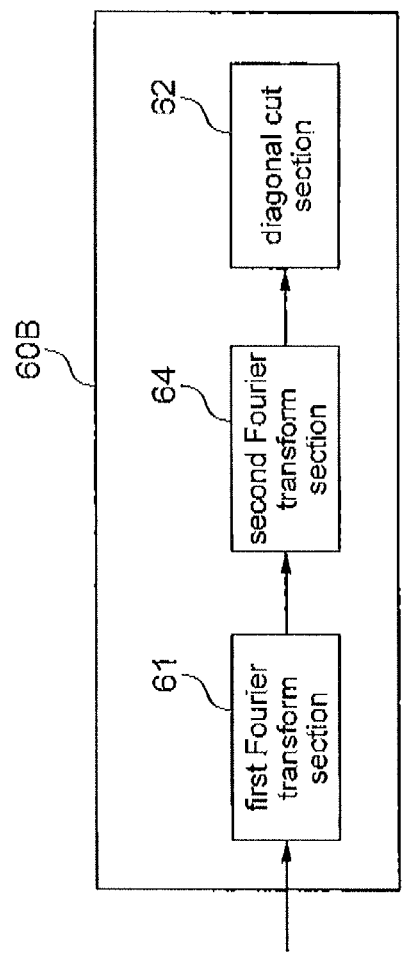
FIG. 18 is a block diagram illustrating a configuration of an arithmetic operation section 60B according to the third placement example.

As shown in FIG. 18, the arithmetic operation section 60B further includes a second Fourier transform section 64 in addition to the first Fourier transform section 61 and the diagonal cut section 62. The second Fourier transform section 64 performs the one-dimensional Fourier transform with respect to a variable x for the data output from the first Fourier transform section. The first Fourier transform section 61 and the diagonal cut section 62 have the same function as those in the first placement example. On the other hand, the first Fourier transform section 61 and the second Fourier transform section 64 may be changed in their position and disposed in a desired sequence. That is, in the third placement example, it may be said that an operation of the second Fourier transform section 64 in the arithmetic operation section 60B implements an optical operation in the X axial direction of the condensing lens 30A in the second placement example through an arithmetic operation.

Figure 19:
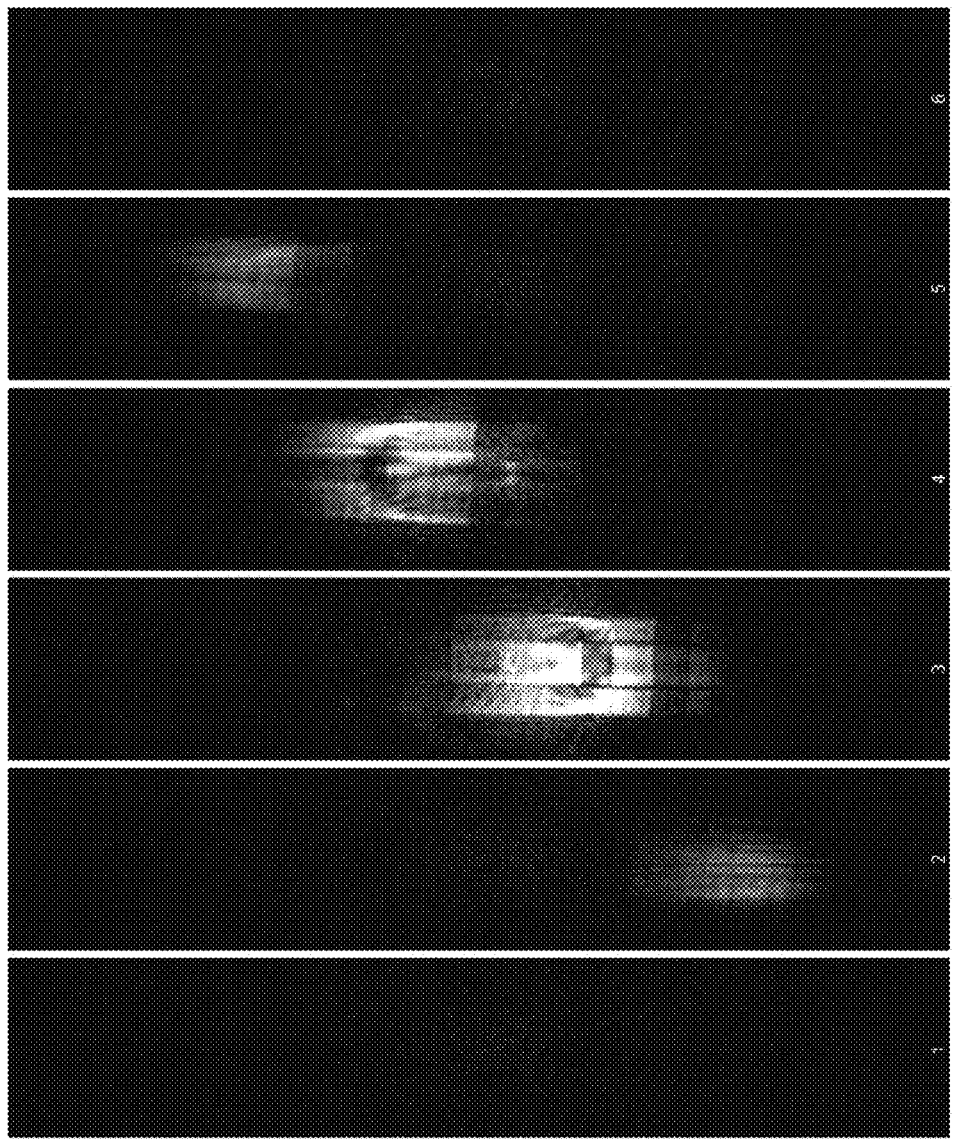
FIG. 19 is a view illustrating amplitude images of the frequency dependence complex amplitude image a with respect to each frequency.
Figure 20:
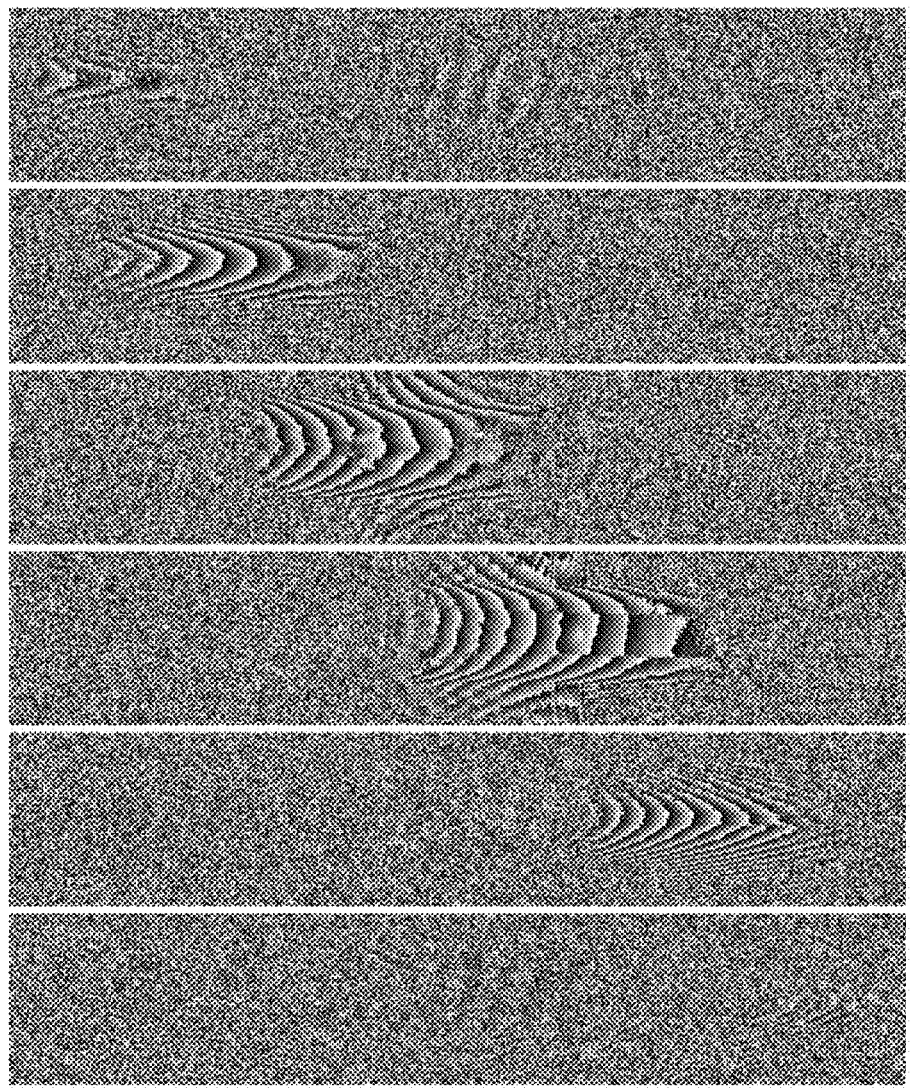
FIG. 20 is a view illustrating phase images of the frequency dependence complex amplitude image a with respect to each frequency.
Figure 21:
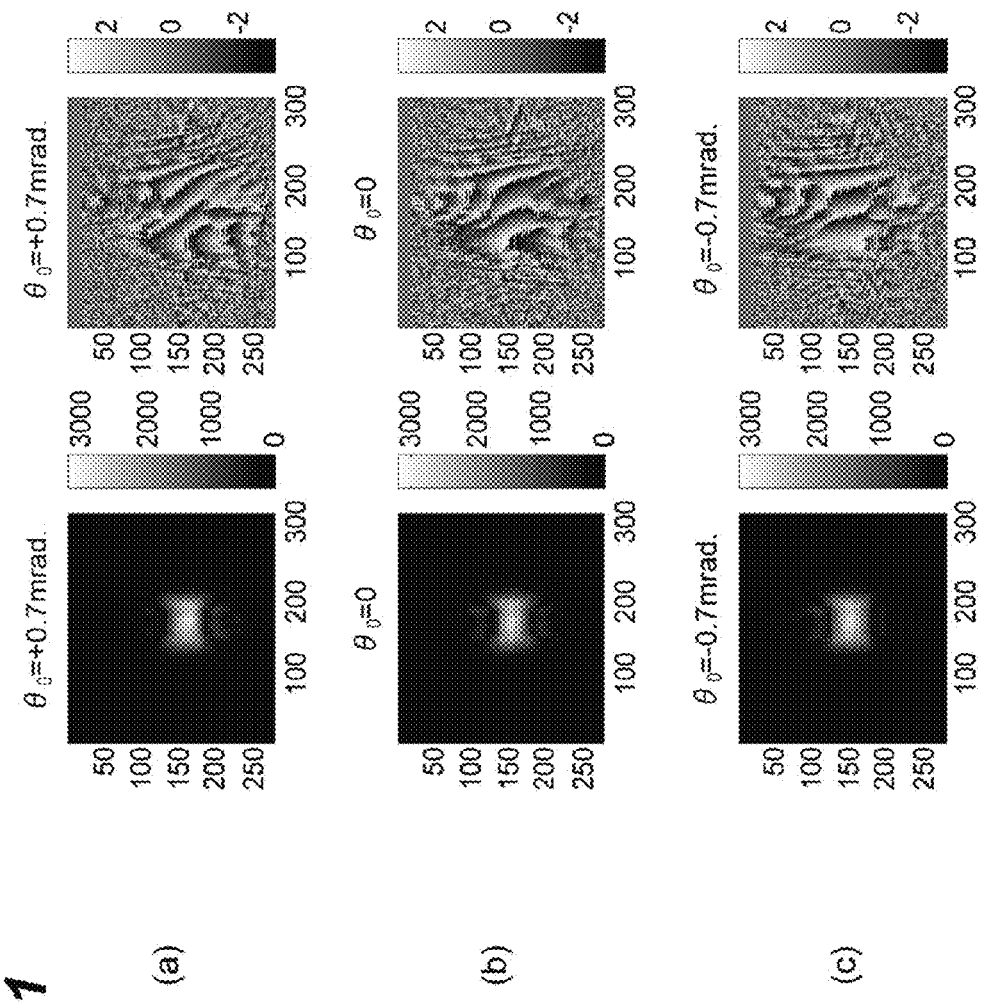
FIG. 21 is a view illustrating the amplitude image of the incident angle dependence complex amplitude image A and the phase image of the incident angle dependence complex amplitude image A, in which the amplitude image is shown on the left and the phase image is shown on the right.

FIGS. 19, 20 and 21 show a complex amplitude image obtained by an observation device of the present placement example. In FIGS. 19, 20 and 21, a circular opening with a diameter of 25 μm, which moves at a velocity of 10 μm/s, is used as the object 2. Further, a CCD camera to output images of 180 sheets with 640×128 pixels and a one pixel size of 7.4×7.4 μm is used as the detection section 50. FIG. 19 shows an amplitude image of a frequency dependence complex amplitude image a (ω, x, y) calculated by the arithmetic operation section 60B for each frequency (number 1 to number 6). FIG. 20 shows a phase image of the frequency dependence complex amplitude image a (ω, x, y) calculated by the arithmetic operation section 60B for each frequency (number 1 to number 6). In FIGS. 19 and 20, a transverse axis is defined as an X axis, and a longitudinal axis is defined as a Y axis.

FIG. 21 shows an incident angle dependence complex amplitude image A ($\theta_0$, x, y) obtained by extracting a plane surface satisfying Equation (1) from the frequency dependence complex amplitude image a (ω, x, y) of FIGS. 19 and 20 by means of the diagonal cut section 62. FIG. 21(a) shows the incident angle dependence complex amplitude image A in the case that an incident angle $\theta_0$=0.7 mrad, FIG. 21(b) shows the incident angle dependence complex amplitude image A in the case that the incident angle $\theta_0$=0 mrad, and FIG. 21(c) shows the incident angle complex amplitude image A in the case that the incident angle $\theta_0$=−0.7 mrad. In the left side of FIGS. 21(a), 21(b) and 21(c), an amplitude image of the incident angle dependence complex amplitude image A is shown, and in the right side of the FIGS. 21(a), 21(b) and 21(c), a phase image of the incident angle dependence complex amplitude image A is shown. In FIG. 21, a transverse axis is defined as an X axis, and a longitudinal axis is defined as a Y axis.

In the observation device 1 of present embodiment, when light is emitted to a moving object 2 from multiple directions by means of a light source section 10 and an illumination lens 20, the moving object 2 scatters light. The scattered light is subjected to an amount of Doppler shift which corresponds to a scattering angle $\theta'$. The scattered light among the scattered lights, which has the identical scattering angle $\theta'$, is received at the same position on the detection section 50. The detection section 50 outputs data temporally changing at a frequency $\omega_d$ that corresponds to an amount of Doppler shift of light that has arrived at each positions on a the light receiving surface, for each position in the first direction and the second direction, at each times. The arithmetic operation section 60 performs a one-dimensional Fourier transform with respect to time is, for data having a position in first-direction on the predetermined plane, a position in the second-direction on the predetermined plane, and a time as variables, and extracts data having the identical incident angle $\theta_0$ relative to the object from the Fourier transformed data, on the basis of the Doppler effect. According to this configuration, since it is possible to extract data with the same incident angle $\theta_0$ for the object by using the Doppler Effect, it is unnecessary to take an image of the object 2 at plural times within a period when the object 2 is regarded to be stopped. Therefore, when the detection section 50 in which a reading speed per pixel is low is used, it is possible to obtain the image of the moving object 2.

Second Embodiment

In the first embodiment, the diagonal cut section 62 extracts a plane surface satisfying Equation (1) so as to obtain the incident angel dependence complex amplitude image A ($\theta_0$, x, y). In the second embodiment, the diagonal cut section 62 has a configuration identical to that of the first embodiment except that it extracts a plane different from that in the first embodiment. Hereinafter, a difference between the first embodiment and the second embodiment will be described, and identical aspects of the second embodiment to the first embodiment will be omitted.

Equations (1) and (8) induced from Equations (5) and (7) make sin $\theta'$ approximate to $\theta'$ and $\theta'$ approximate to y/$f_Y$. By using the approximation, the incident angle dependence complex amplitude image A ($\theta_0$, x, y) becomes a flat surface. Further, Equations (1) and (8) are formulas established in the condensing lenses 30, 30A and 30B satisfying the Abbe sine condition for the Y axial direction. On this account, if the condensing lenses 30, 30A and 30B satisfying the Abbe sine condition are used instead of the approximation, the incident angle dependence complex amplitude image A ($\theta_0$, x, y) becomes a flat surface. In the diagonal cut section 62 of the present embodiment, two approximations are not applied, and the incident angle dependence complex amplitude image a ($\theta_0$, x, y) is obtained by following Equation (2) which is an exact formula of Equations (1) and (8).

[Equation (2)]

$$\omega - \Omega = \frac{2\pi V}{\lambda}\left[\sin\left(\tan^{-1}\left(\frac{y}{f_Y}\right)\right) - \sin\theta_0\right] \quad (2)$$

Equation (2) which is the exact formula is not a linear function, differently from Equations (1) and (8) which are approximation. However, the incident angle dependence complex amplitude image A with a high precision can be obtained by extracting the incident angle dependence complex amplitude image A ($\theta_0$, x, y) from a surface S satisfying Equation (2).

Modification

In the observation device 1 of the present embodiment, when the velocity of the object 2 is changed, a frequency modulation in a Doppler signal occurs, and an image of the object 2 which is finally obtained expands and contracts in a flowing direction. In order to correct these expansions and contractions, it is preferred that the observation device 1 of the present embodiment further includes a velocity detecting section for detecting a moving velocity of the object 2. Further, it is preferred that the arithmetic operation section 60 performs a correction related to the velocity change of the object 2 in one dimensional Fourier transform of a time direction based on the velocity of the object 2 detected by the velocity detecting section. A photography timing of the velocity detecting section 50 may be set based on the velocity of the object 2 detected by the velocity detecting section.

Any type of velocity detecting section may be used as the velocity detecting section. However, the moving velocity of the object 2 can be obtained only by detecting a frequency of a signal at a position, where scattered light arrives at on the back focal plane of the condensing lens 30, by using a relation between the moving velocity and the amount of the Doppler shift. In this case, the velocity detection section may detect light, which is diverged from light directed from a beam splitter HM2 to the detection section 50, on the Fourier plane. On the other hand, the velocity detection section may detect light at a pixel independently installed on some portion of the light receiving surface of the detection section 50. The pixel preferably has a size corresponding to an area having a resolution of the moving velocity induced from the relation of the moving velocity V of the object 2 and the Doppler frequency $\omega_d$.

In the observation device 1 of the present embodiment, in the second embodiment, light among the light $L_0$ emitted to the object 2 (zero order light), which is not scattered by the object 2, is condensed at a point of the detection section 50. When the zero order light arrives at the light receiving surface of the detection section 50, a quality of signal obtained by the detection section 50 is deteriorated. Accordingly, a neutral density filter may be installed in order to decrease the zero order light such that all the zero order light does not arrive at the light receiving surface of the detection section 50. Alternately, light having a beam-cross section in which the zero order light hardly occurs may be emitted to the object 2. It is preferred to correct strength non-uniformity by evaluating strength to the light arriving at the detection section 50 when the object 2 is not present between the light source section 10 and the detection section 50.

In the above description, the embodiment in which the image of the object of the light source is acquired by a transmitted illumination has been mainly described. However, it is apparent that the image of the object may be acquired by a reflected illumination (epi-illumination) or an ultra-illumination. As a light source, use of light in a single longitudinal mode is appropriate, but the light source is not limited thereto. For example, information on a depth of a phase object may be acquired by using light of a broadband. Moreover, it is appropriate that light in which a phase relation between wavelength components is constant is used as broadband light. For example, a mode-locked laser may be used as such a light source.

REFERENCE SIGN LIST

1 . . . observation device, 2 . . . object, 10 . . . light source section, 20 . . . illumination lens, 30, 30A, 30B . . . condensing lens, 40 . . . modulation section (modulator), 50 . . . detection section, 60, 60A, 60B . . . arithmetic operation section, 61 . . . first Fourier transform section, 62 . . . diagonal cut section (extraction section), 63 . . . secondary phase division section, 64 . . . second Fourier transform section.

The invention claimed is:

1. An apparatus for observing a moving object comprising:
a light source section configured to output light to be emitted to the object;
an optical system configured to receive the output light and split the received light into first light and second light in front of the object, and emit the first light to the object from multiple directions;
a detection section configured to be disposed on a predetermined plane such that scattered light having an identical scattering angle from among scattered light generated by the object upon irradiation with the light by the optical system enters at an identical position, and when a direction perpendicular to a moving direction of the object is defined as a first direction and a direction parallel with the moving direction of the object is defined as a second direction, output data temporally changing at a frequency corresponding to an amount of Doppler shift of light that reaches at each position on the predetermined plane, for each position in the first direction and the second direction, at each times; and an arithmetic operation section configured to perform a one-dimensional Fourier transform with respect to time variables, for data having a position in the first direction on the predetermined plane, a position in the second direction on the predetermined plane, and a time as variables, and extract data having an identical incident angle relative to the object from the Fourier-transformed data, on the basis of Doppler Effect;

wherein the optical system modulates the first light or the second light with a modulator, and then causes a heterodyne interference between the scattered light and the second light on the predetermined plane.

2. The apparatus of claim 1, wherein the arithmetic operation section extracts data of a plane satisfying following Equation (1) from the Fourier transformed data, $$\omega - \Omega = \alpha y + \beta \sin \theta_0 \quad (1)$$

in which $\omega$ is a time frequency of the Fourier transformed data, $\Omega$ is a modulation frequency, y is a position in the second direction of the detection section, $\theta_0$ is the incident angle, and $\alpha$ and $\beta$ are constant.

3. The apparatus of claim 1, further comprising a condensing lens configured to be interposed between the object and the detection section, wherein the arithmetic operation section extracts data of a plane satisfying following Equation (2) from the Fourier transformed data, $$\omega - \Omega = \frac{2\pi V}{\lambda} \left[ \sin\left(\tan^{-1}\left(\frac{y}{f_Y}\right)\right) - \sin\theta_0 \right] \quad (2)$$

in which $\omega$ is a time frequency of the Fourier transformed data, $\Omega$ is a modulation frequency of the modulator, V is a moving velocity of the object, $\lambda$ is a wavelength of the light emitted by the light source section, y is a position in the second direction of the detection section, $f_y$ is a focal distance in the second direction of the condensing lens, and $\theta_0$ is the incident angle.

4. The apparatus of claim 1, further comprising a condensing lens configured to be interposed between the object and the detection section, wherein the light receiving surface of the detection section is disposed on a surface in which a Fresnel diffraction image of the object is formed in the first direction and a Fraunhofer diffraction image of the object is formed in the second direction by the condensing lens, and wherein the arithmetic operation section comprises a first Fourier transform section configured to perform a one dimensional Fourier transform with respect to a time variable, a second Fourier transform section configured to perform a one dimensional Fourier transform with respect to the first direction, an extraction section configured to extract the data having an identical incident angle with respect to the object based on the Doppler Effect, and a secondary phase division section configured to divide the data by a secondary phase which is a value determined by a position at which the detection section is disposed.

5. The apparatus of claim 1, further comprising a condensing lens configured to be interposed between the object and the detection section, wherein the light receiving surface of the detection section is disposed on a surface in which a Fraunhofer diffraction image of the object is formed in the first direction and a Fraunhofer diffraction image of the object is formed in the second direction by the condensing lens, and wherein the arithmetic operation section comprises a first Fourier transform section configured to perform a one dimensional Fourier transform with respect to a time variable, and an extraction section configured to extract data having an identical incident angle with respect to the object based on the Doppler Effect.

6. The apparatus of claim 1, further comprising a condensing lens configured to be interposed between the object and the detection section, wherein the light receiving surface of the detection section is disposed on a surface in which an image of the object is formed in the first direction and a Fraunhofer diffraction image of the object is formed in the second direction by the condensing lens, and the arithmetic operation section comprises a first Fourier transform section configured to perform a one dimensional Fourier transform with respect to a time variable, a second Fourier transform section configured to perform the one dimensional Fourier transform on the first direction, and an extraction section configured to extract data having an identical incident angle with respect to the object based on the Doppler Effect.

7. The apparatus of claim 3, wherein the light receiving surface of the detection section is disposed on a surface in which a Fresnel diffraction image of the object is formed in the first direction and a Fraunhofer diffraction image of the object is formed in the second direction by the condensing lens, and wherein the arithmetic operation section comprises a first Fourier transform section configured to perform a one dimensional Fourier transform with respect to a time variable, a second Fourier transform section configured to perform a one dimensional Fourier transform with respect to the first direction, an extraction section configured to extract the data having a identical incident angle with respect to the object based on the Doppler Effect, and a secondary phase division section configured to divide the data by a secondary phase which is a value determined by a position at which the detection section is disposed.

8. The apparatus of claim 3, wherein the light receiving surface of the detection section is disposed on a surface in which a Fraunhofer diffraction image of the object is formed in the first direction and a Fraunhofer diffraction image of the object is formed in the second direction by the condensing lens, and wherein the arithmetic operation section comprises a first Fourier transform section configured to perform a one dimensional Fourier transform with respect to a time variable, and an extraction section configured to extract data having an identical incident angle with respect to the object based on the Doppler Effect.

9. The apparatus of claim 3, wherein the light receiving surface of the detection section is disposed on a surface in which an image of the object is formed in the first direction and a Fraunhofer diffraction image of the object is formed in the second direction by the condensing lens, and wherein the arithmetic operation section comprises a first Fourier transform section configured to perform a one dimensional Fourier transform with respect to a time variable, a second Fourier transform section configured to perform a one dimensional Fourier transform with respect to the first direction, and an extraction section configured to extract data having an identical incident angle with respect to the object based on the Doppler Effect.

10. The apparatus of claim 1, further comprising a condensing lens configured to be interposed between the object and the detection section, wherein the condensing lens is a fθ lens, and wherein the arithmetic operation section extracts data of a plane satisfying following Equation (3) from the Fourier transformed data, $$\omega - \Omega = \frac{2\pi V_Y}{\lambda}\left[\sin\left(\frac{y}{f_Y}\right) - \sin\theta_0\right] \quad (3)$$

in which ω is a time frequency of the Fourier transformed data, Ω is a modulation frequency of the modulator, $V_y$ is a moving velocity in the second direction of the object, λ is a wavelength of the light emitted by the light source section, y is a position in the second direction of the detection section, $f_Y$ is a focal distance in the second direction of the condensing lens, and $\theta_0$ is the incident angle.

11. The apparatus of claim 1, further comprising an illumination lens configured to receive the light emitted by the light source section and emit the light diverged or converged in the second direction to the object, the illumination lens being interposed between the light source section and the object.

12. The apparatus of claim 1, further comprising a velocity detection section configured to detect a moving velocity of the object, wherein the arithmetic operation section performs a correction relating to a velocity change of the object while performing the one dimensional Fourier transform with respect to a time variable based on the velocity of the object detected by the velocity detection section.

13. The apparatus of claim 1, wherein an emission of the light to the object is performed by an optical arrangement of a transmitted illumination.

14. The apparatus of claim 1, wherein an emission of the light to the object is performed by an optical arrangement of a reflected illumination.

15. The apparatus of claim 1, wherein the light source section is a light source configured to generate light of a single longitudinal mode.

16. The apparatus of claim 1, wherein the light source section is a light source configured to generate broadband light.

17. The apparatus of claim 16, wherein the light source section is a mode-locked laser.

* * * * *